(12) United States Patent
Takahashi et al.

(10) Patent No.: US 8,514,998 B2
(45) Date of Patent: Aug. 20, 2013

(54) INDUCTION HEATING STRESS IMPROVEMENT

(75) Inventors: Shiro Takahashi, Hitachi (JP); Kouji Shiina, Mito (JP); Shoji Hayashi, Hitachinaka (JP); Hideyo Saito, Hitachi (JP); Minoru Masuda, Hitachi (JP); Satoshi Kanno, Hitachi (JP); Kenichi Nihei, Hitachiohta (JP); Hiroaki Asakura, Hitachi (JP)

(73) Assignee: Hitachi-Ge Nuclear Energy, Ltd., Ibaraki (JP)

( * ) Notice: Subject to any disclaimer, the term of this patent is extended or adjusted under 35 U.S.C. 154(b) by 1253 days.

(21) Appl. No.: 11/320,972

(22) Filed: Dec. 30, 2005

(65) Prior Publication Data

US 2006/0197638 A1    Sep. 7, 2006

(30) Foreign Application Priority Data

Jan. 31, 2005   (JP) .................. 2005-022386

(51) Int. Cl.
*G21C 17/032*    (2006.01)
*G21C 17/022*    (2006.01)

(52) U.S. Cl.
USPC ............ 376/245; 376/210; 376/211; 376/247

(58) Field of Classification Search
USPC .................................................... 376/249
See application file for complete search history.

(56) References Cited

U.S. PATENT DOCUMENTS 4,801,421 A * 1/1989 Ackerson et al. ............. 376/249
5,993,761 A * 11/1999 Czernichowski et al. .... 423/210

FOREIGN PATENT DOCUMENTS

| JP | 02-285027 | * | 4/1984 |
| JP | 61-030626 | * | 7/1984 |
| JP | 61-119619 | * | 11/1984 |
| JP | 61-030626 |   | 2/1986 |
| JP | 62-222029 | * | 3/1986 |
| JP | 62-280327 | * | 5/1986 |
| JP | 61-119619 |   | 6/1986 |
| JP | 63-143221 | * | 12/1986 |
| JP | 62-023934 | * | 1/1987 |
| JP | 62-23934 A |  | 1/1987 |
| JP | 62-153733 | * | 7/1987 |
| JP | 62-222029 |   | 9/1987 |
| JP | 62-280327 |   | 12/1987 |
| JP | 63-057725 | * | 3/1988 |
| JP | 63-143221 |   | 6/1988 |
| JP | 63-161122 | * | 7/1988 |
| JP | 63-171828 | * | 7/1988 |
| JP | 63-132397 U |  | 8/1988 |
| JP | 63-133394 U |  | 8/1988 |
| JP | 02-282428 | * | 11/1990 |
| JP | 2-282428 |   | 11/1990 |
| JP | 2-285027 |   | 11/1990 |
| JP | 06-051084 | * | 2/1994 |
| JP | 6-051084 |   | 2/1994 |
| JP | 07-280987 | * | 10/1995 |
| JP | 07-280987 A |  | 10/1995 |
| JP | 63-057725 |   | 3/1998 |

* cited by examiner

*Primary Examiner* — Jack W Keith
*Assistant Examiner* — Sean P Burke
(74) *Attorney, Agent, or Firm* — Mattingly & Malur, PC

(57) ABSTRACT

In implementing an induction heating stress improvement (IHSI) method in a nuclear plant, cooling characteristic with respect to the inner surface of piping is improved by appropriate structure/layout of nozzles, and further, the cooling effect when applying IHSI to a real machine is verified by installing a thermometer, as well as air in the portion subjected to IHSI is removed by heating the piping prior to the execution of IHSI.

3 Claims, 28 Drawing Sheets

FIG. 2
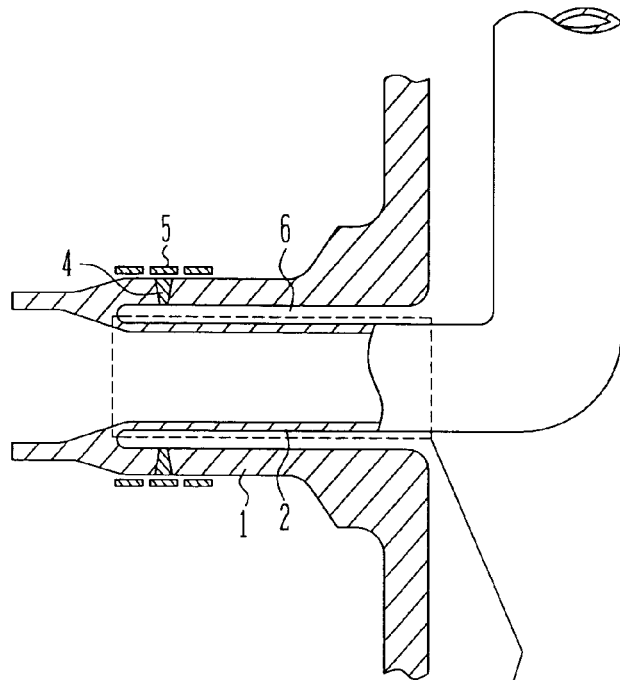
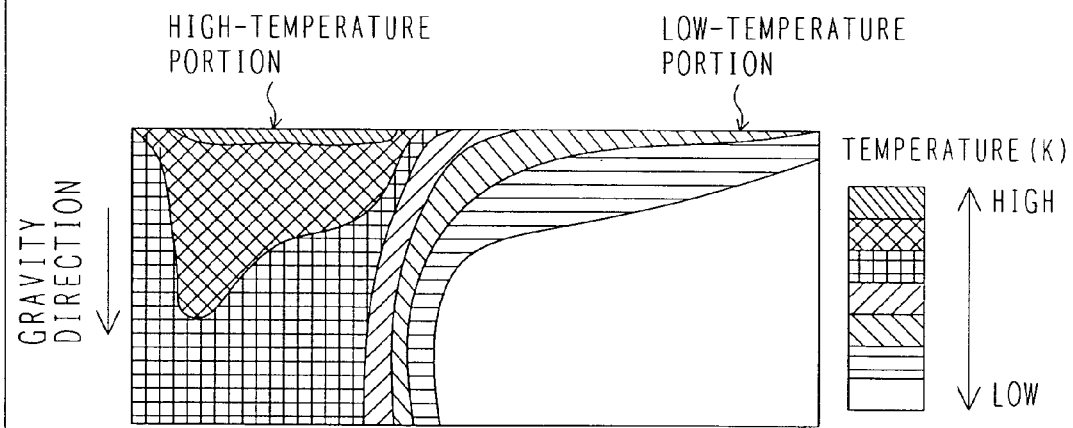

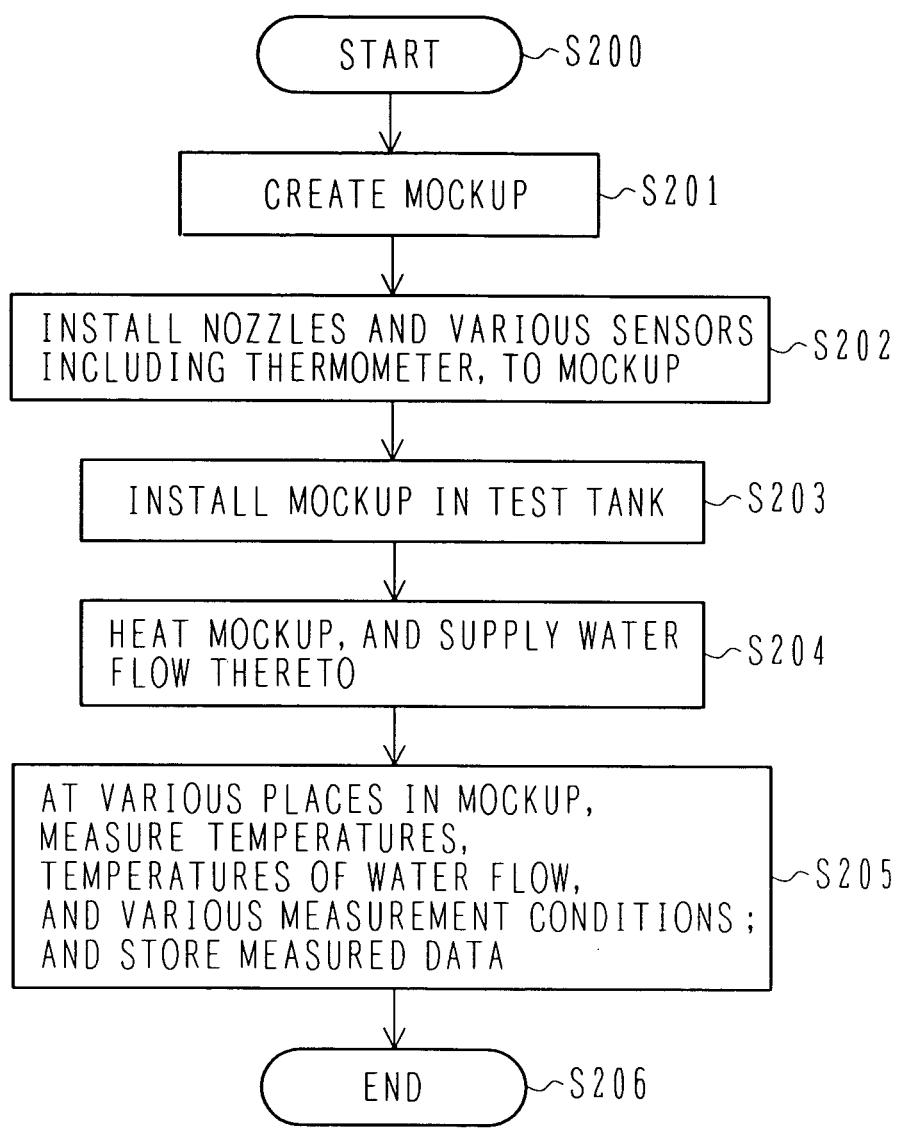

FIG.9A
FIG.9B
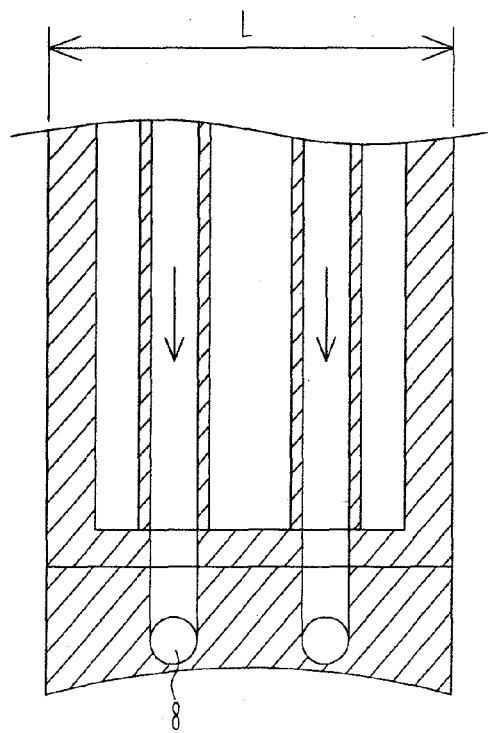
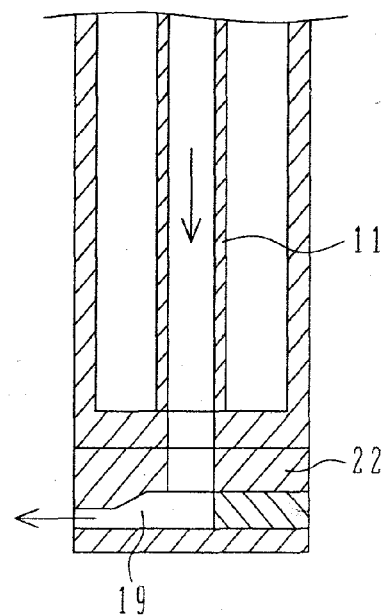

INDUCTION HEATING STRESS IMPROVEMENT

BACKGROUND OF THE INVENTION

1. Field of the Invention

The present invention relates to an induction heating stress improvement method (hereinafter abbreviated as "IHSI" method) in a primary loop recirculation piping (hereinafter abbreviated as "PLR" piping) of a nuclear power plant.

2. Description of the Related Art

As an example of conventional IHSI method for a double metal, there is a method disclosed in JP, A 2-282428. In this conventional art, water flows are alternately sprayed into an annular space, and the nozzle outer surface surrounding the annular space is heated to provide a temperature difference to the nozzle wall, whereby residual stress is relaxed.

Conventional inventions, however, have encountered a problem in that they exerted an enhanced cooling effect but have been incapable of verifying a cooling effect when applying IHSI to an actual machine. Particularly in a recirculation inlet nozzle (hereinafter referred to as an "N2 nozzle") having a narrow annular clearance, it is very difficult to spray a fluid to produce a flow in the annular clearance. Furthermore, the inner surfaces of the piping of actual machines would have various asperities depending on the individual piping although these are merely slight asperities to the extent they present no problem in terms of performance and structure of the machines, and/or the outer surface of the piping may not have a perfectly circular cross-section. As a result, it is difficult to dispose a cooling nozzle apparatus in the reactor in a proper position, thereby causing a possibility that the nozzle may not be directed toward the direction of the annular clearance. Hence, it is necessary to verify, in the actual machine, whether a jet is sufficiently flowing into the annular clearance. That is, it is important to verify a cooling effect with respect to the inner surface of the piping when applying IHSI to the actual machine, and a contrivance is needed to cause the jet to efficiently flow into the narrow annular clearance.

Conventional techniques require a plurality of devices such as a large number of jet nozzles, piping for use in connection, and the like, in order to secure a sufficient cooling effect. In a nuclear power plant, a rationalized apparatus is desired from the viewpoint of reducing radioactive waste to a minimum. If an apparatus which allows a cooling effect to be verified, and a jet to be efficiently flowed into the annular clearance, can be applied then the number of above-described redundant devices can be reduced.

Furthermore, in the PLR piping of a reactor, a flange or an air vent cannot be installed from the viewpoint of ensuring safety and leakage prevention. As such, air could stagnate in a closed stagnation portion such as the nozzle to decontaminate, and might make it impossible for the cooling water to perform cooling when executing IHSI, which entails the removal of air. This is because air is very low in thermal conductivity and heat transfer coefficient, and poses a significant detriment to the execution of IHSI. Such stagnant air cannot be removed by only water flows, which has become a problem associated with the application of IHSI.

SUMMARY OF THE INVENTION

To solve the above-described problems, a thermometer is installed to a cooling apparatus for IHSI to measure the temperature of a fluid subjected to a temperature rise by cooling. By measuring the temperature of a fluid flowing out from the annular clearance by a jet from the fluid nozzle, it is possible to verify a cooling effect in the actual machine. By using a computational fluid dynamics analysis or tests in advance, the relationship between the fluid temperature distribution in the annular clearance (the fluid temperature in a portion subjected to IHSI is especially important) and the temperature of the fluid flowing out from the annular clearance is determined. If the temperature measured by the thermometer is a predetermined estimated temperature, it is considered that a heated surface is being cooled due to a forced convection by the nozzle. On the other hand, if the temperature measured by the thermometer is shifted from the estimated temperature, it is considered that the forced convection by the nozzle is not effectively working. For example, IHSI is executed according to an algorithm shown in FIG. 3. Since the boiling of the fluid in the annular clearance makes cooling impossible, it is especially important that the temperature of the fluid in the annular clearance does not exceed the saturation temperature thereof.

If a characteristic graph and/or relationship diagram for estimating a maximum temperature and/or temperature distribution on the inner surface of the piping versus the temperature of the fluid discharged from the annular clearance in response to a flow amount supplied from the nozzle, is prepared in advance, then it can be readily found, in the process of executing IHSI operation, that a cooling effect with respect to the inner surface of the piping is being obtained. That is, it becomes clear in real time that the operation is correct.

Unless positions in the peripheral direction of the cooling nozzles and a position of the thermometer to be installed are properly laid out, the temperature of the fluid flowing out from the annular clearance cannot be measured, and an estimated temperature evaluation might become impossible. In this case, it is necessary to install a thermometer such as a thermocouple at a position where a high-temperature fluid flows out. To this end, the installation position of the thermometer must be deviated from that of the cooling nozzles in the peripheral direction.

While the foregoing description mainly concerns the verification of the cooling effect, attention to the characteristics of the nozzle is required in order to realize a reliable cooling effect by efficiently flowing a jet into the annular clearance.

One of method for satisfying a reliable cooling effect involves the case in which nozzles are installed at an upper portion of a cylinder. In this method, on the tangential surface (a range in which jets from the nozzles are accommodated within the annular clearance) in the peripheral direction, of an inner cylinder, the nozzles are each tilted from the surface in the horizontal direction toward the cylinder center line (the line connecting the upper and lower ends the cylinder). This tilting allows the area occupied by a coolant jetted from the nozzles to move to the center of the annular clearance, and turbulence to be amplified by interference between the two jet flows. Test results with an actual machine-sized model showed that a tilt angle of 9 degrees provides an optimum result.

Furthermore, in this case, the nozzles are not installed in a structure adjacent to the cylinder, but a hole for coolant jetting is made in the structure itself to issue jet flows from the hole. Herein, in order to increase the speed of the jet flows, the hole needs a narrowed portion.

Also, insertion of the tips of the nozzles into the annular clearance allows jets to be reliably flowed into the annular clearance, thereby enhancing the cooling effect.

When the annular clearance is especially narrow, it is desirable to use a method in which a structure (pad) having a seal mechanism along the inner cylinder is covered, and in which a coolant is flowed into the annular clearance along a flow path formed between a structure (pad) provided along the outer surface of the inner cylinder and the outer surface of the inner cylinder, to promote the cooling effect. Thereby, a flow along the outer surface of the inner cylinder is formed, which enables a flow to be generated even in the narrow annular clearance.

The use of a sink flow prevents flows from becoming local flows like jet flows, thereby allowing for a stable cooling effect. Also, by varying the flow rate and pressure using the variation in number of revolutions of a primary loop recirculation (PLR) pump and/or the variation in the opening of valves, the cooling effect can also be improved.

As a method for removing air when executing IHSI, the present invention executes the following means. The area that most requires the removal of air is a nozzle to decontaminate. In general, non-condensing gas such as air, having a low density, stagnates at an upper portion of a pipe, so that air cannot be removed by the water flows. The present invention has implemented the removal of air using the following procedure. First, the water flows are stopped or water is flowed at a low flow rate, with the piping heated from the outside. Upon arrival at its saturation temperature, water in the piping evaporates into water vapor. Since the water vapor is lower in density than air, air stagnant in an upper portion is gradually pushed out by the water vapor. That is, because the evaporation of water increases the volume thereof by a factor of 1000, air is easily pushed out by the water vapor. As a result, the nozzle to decontaminate is filled with water vapor. Next, upon stopping heating and starting cooling, the temperature of the water vapor decreases and the water vapor starts to condense. When the water vapor decreases in temperature, it changes states into water, so that the nozzle to decontaminate is filled with the water. As a consequence, non-condensing gases, air, and the like could be totally removed from the nozzle to decontaminate. Thus, the execution of IHSI enables air in the stagnant portion such as the nozzle to decontaminate to be completely discharged. Meanwhile, the speed of the water flow is different between the time when IHSI is executed and the time when air removal is performed. When executing IHSI, the highest possible flow rate is required in order to suppress boiling and cool the inner surface of the piping, but when performing air removal, it is necessary to reduce the flow rate in order to promote boiling. Valves are provided in front of and behind the annular nozzle to decontaminate, and therefore, when performing air removal, it is desirable to heat the nozzle to decontaminate in an enclosed state or somewhat closed state, making use of the valves. As described above, the present invention has solved the above-described problems by taking advantage of the physical properties of air and water vapor and the state change of the water vapor.

By the application of the present invention, it is possible to secure inner surface cooling when applying IHSI to an actual machine, and to reliably relax residual stress at a PLR piping welded portion. This allows for more reliable execution of IHSI to be implemented.

BRIEF DESCRIPTION OF THE DRAWINGS

FIG. 2 is a schematic diagram of analysis results of temperature distribution in an annular clearance of recirculation inlet nozzle.

FIG. 4 is a flowchart of operational steps for deriving the relation ship between the temperature distribution in the annular clearance and the outflowing fluid temperature.

FIG. 9 is a schematic diagram of a piping cooling technique in IHSI according to the present invention;

DESCRIPTION OF THE PREFERRED EMBODIMENTS

Figure 1A:
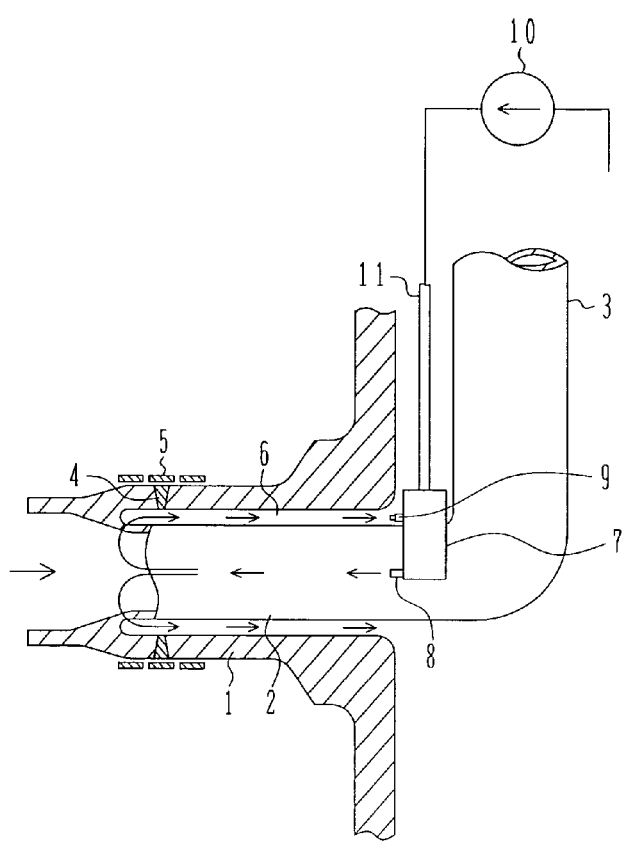
FIG. 1 is a schematic diagram of a piping cooling technique in IHSI according to the present invention.

A piping cooling technique in an IHSI method according to the present invention will be described with reference to FIG. 1. FIG. 1 is a constructional view of a recirculation inlet according to an embodiment of the present invention. The recirculation inlet comprises an N2 nozzle 1, a thermal sleeve 2 therein arranged, and a riser tube 3 serving as a jet pump and connected to the thermal sleeve 2. At a welding portion 4 in the N2 nozzle 1, the residual stress can be relaxed by the execution of IHSI method. This enables enhancement of the safety of nuclear power generation. The IHSI method is a method for heating the outer surface of the piping by a heater 5 provided in the outer surface of the piping and cooling the inner surface of the piping by water in the piping, whereby residual stress is relaxed by a thermal gradient in the cross-section of the piping. When the piping is a pure straight pipe, the inner surface of the piping is sufficiently cooled, and there is no problem. However, in an annular clearance 6 on the piping inner surface at the welding portion, since the flow stagnates, fluid temperature increases by the heating from the outside, so that the inner surface of the piping could not sufficiently cooled. With this being the situation, in this embodiment, at least one nozzle 8 is installed and is caused to jet cooling water toward the direction of the annular clearance, thereby cooling the heated inner surface of the piping. Also, in this embodiment, at least one thermometer 9 is installed to measure a fluid temperature. Two nozzles 8 are arranged in a horizontal direction, and one thermometer is disposed above the nozzles, that is, in a state where they are displaced from one another. Cooling water is driven by a circulating pump 10 provided outside a reactor, and jetted from the nozzles 8 through the piping 11. As indicated by arrows in FIG. 1, the jet flows of the nozzles 8 arranged in the horizontal direction (3 o'clock direction and 9 o'clock direction) are jetted toward the welding portion 4, and are flowed into the reactor from the upper side and lower side (0 o'clock position and 6 o'clock position) of the annular clearance. With the direction of flow considered, regarding the outside of the annular clearance (i.e., the outside of intersection points between the outer periphery of the annular clearance and the lines of 45 degrees and 135 degrees), above-described regions are mutually distinguished by lines extending upward (to the upper side) from the above-described intersection points. Furthermore, installation of the thermometer 9 to the cooling apparatus eliminates the need for a structure for use in a new thermometer or an apparatus for guiding the flow in the reactor. Here, it would be desirable to install the nozzles on the rear surface, side surface, or bottom surface of the cooling apparatus rather than on the front surface, since flows issued from the annular clearance can easily cross the thermometer on the above-described rear, side, or bottom surface. However, front surface positions that are located higher than the top end of the annular clearance could be used as nozzle installation positions without posing any problem. Also, the temperature measurement may also be performed in the RPV.

Figure 3:
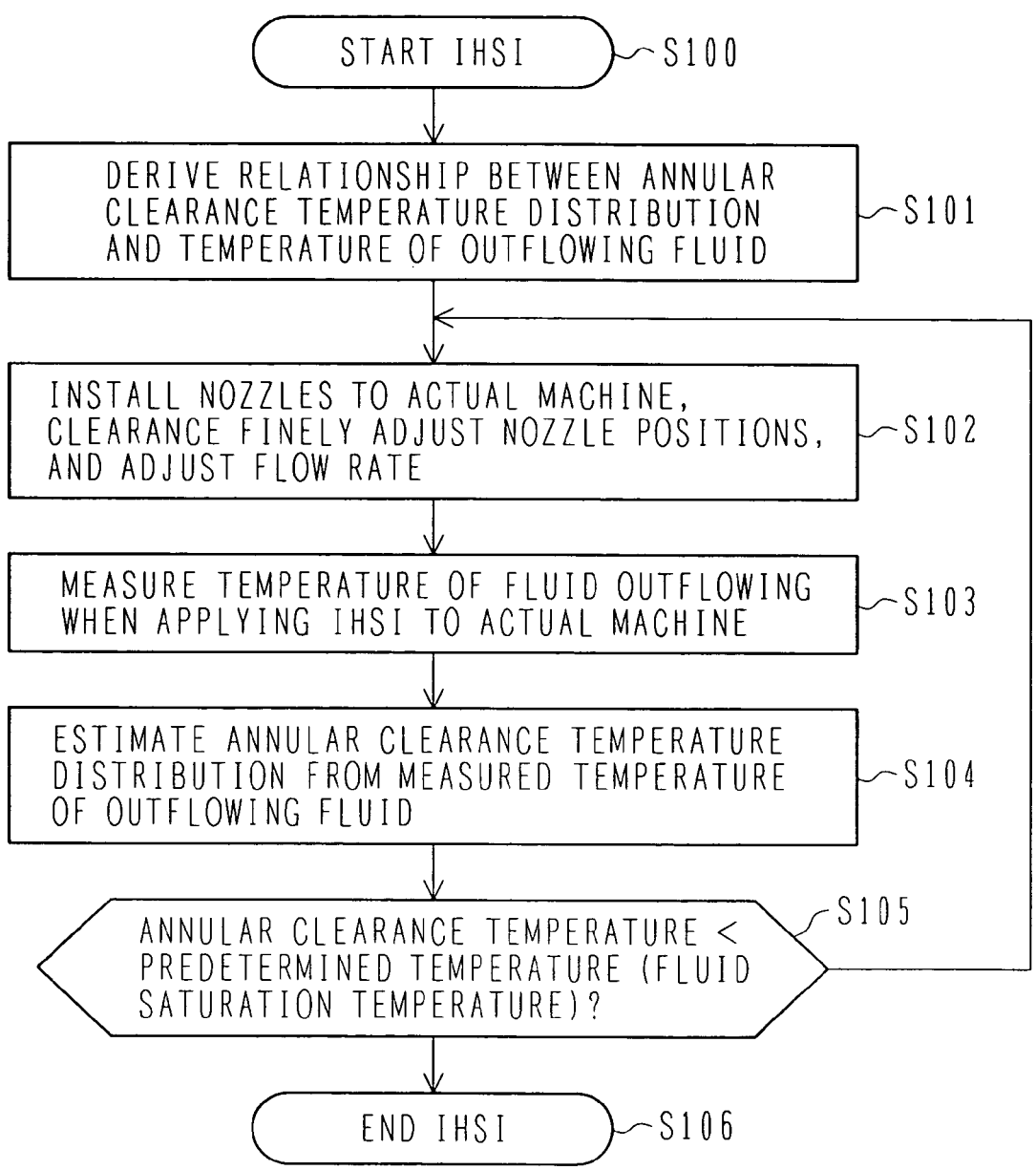
FIG. 3 is a flowchart of implementation procedure for IHSI according to the present invention.

FIG. 3 shows IHSI steps in embodiments according to the present invention. These steps will be described below.

(Step 100) IHSI is started.

(Step 101) As will be described later, the relationship between the annular clearance strength distribution and the temperature of outflowing fluid is derived.

(Step 102) Nozzles for IHSI are installed to an actual machine, and a fine adjustment of nozzle positions and a flow rate adjustment are performed.

(Step 103) The temperature of fluid flowing out when IHSI is executed is measured by a temperature sensor.

(Step 104) An annular clearance temperature distribution is calculated/estimated by a computer, based on the temperature of the outflowing fluid, measured by the temperature sensor.

(Step 105) It is calculated and determined by the computer whether the annular clearance temperature is not more than a predetermined temperature (fluid saturation temperature). Also, at step 105, a command indicating that the annular clearance temperature has not yet arrived at a temperature of not more than predetermined temperature, returns to step 102, and a fine adjustment of nozzle positions and a flow rate adjustment are performed again to execute IHSI.

(Step 106) It is verified that the, in step 104, IHSI has been executed under the condition the annular clearance temperature is not more than a predetermined temperature, and thereupon IHSI process is completed.

FIG. 2 shows a temperature distribution at this time in the annular clearance. Under natural convection, a high-temperature fluid moves to an upper portion of the annular clearance while a low-temperature fluid moves to a lower portion thereof. In particular, in the back region of an upper portion of the annular clearance, high-temperature water stagnates. As a result, when a flow as shown in FIG. 1A occurs, the high-temperature water heated by a heater crosses high-temperature the thermometer disposed at an upper portion. If the flow assumed in FIG. 1A does not occur, the high-temperature water does not cross the thermometer. Therefore, flow occurring at the heater portion can be estimated from the temperature value measured by the thermometer, and thereby presence of a cooling effect can be verified. For particulars, using in advance a computational fluid dynamics analysis or model tests, the relationship between the fluid temperature distribution in the annular clearance and the fluid temperature flowing out therefrom is determined, which makes it possible to perform a high-accuracy evaluation. Of course, it is also advisable to prepare in advance a characteristic graph allowing estimating a maximum temperature and/or temperature distribution on the inner surface of piping, from the temperature of the fluid flowing out therefrom in response to an amount of flow supplied from the nozzles.

In executing the above-described IHSI method according to the present invention, processing shown in FIG. 4 is performed in advance, in order to derive the required relationship between the fluid temperature distribution in the annular clearance and the temperature of outflowing fluid. These processing steps will be described below.

(Step 200) The derivation of the relationship between the fluid temperature distribution in the annular clearance and the temperature of outflowing fluid is started.

(Step 201) A mockup of an actual machine to be subjected to IHSI is created.

(Step 202) Nozzles for supplying water flows to the mockup created in step 201 and various sensors such as a water-pressure gauge, water meter, and thermometer are installed.

(Step 203) The mockup is arranged in a test tank.

(Step 204) Water flows are supplied to the mockup and IHSI is executed.

(Step 205) Temperatures, water flow temperatures at various places in the mockup, and various measurement conditions, such as water pressure of water flows, and the pressure in a pump, are calculated, and the calculated data is stored into the computer.

(Step 206) The derivation of the relationship between the fluid temperature distribution in the annular clearance and the temperature of outflowing fluid is completed.

In this manner, by deriving the relationship between the fluid temperature distribution in the annular clearance and the temperature of outflowing fluid in the mockup, it becomes possible to derive the relationship between the fluid temperature distribution in the annular clearance and the temperature of outflowing fluid in the actual machine to be subjected to IHSI.

Figure 1B:
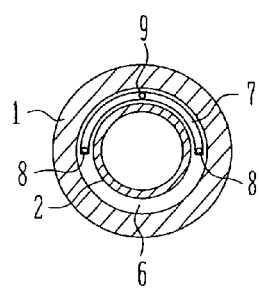
Figure 5A:
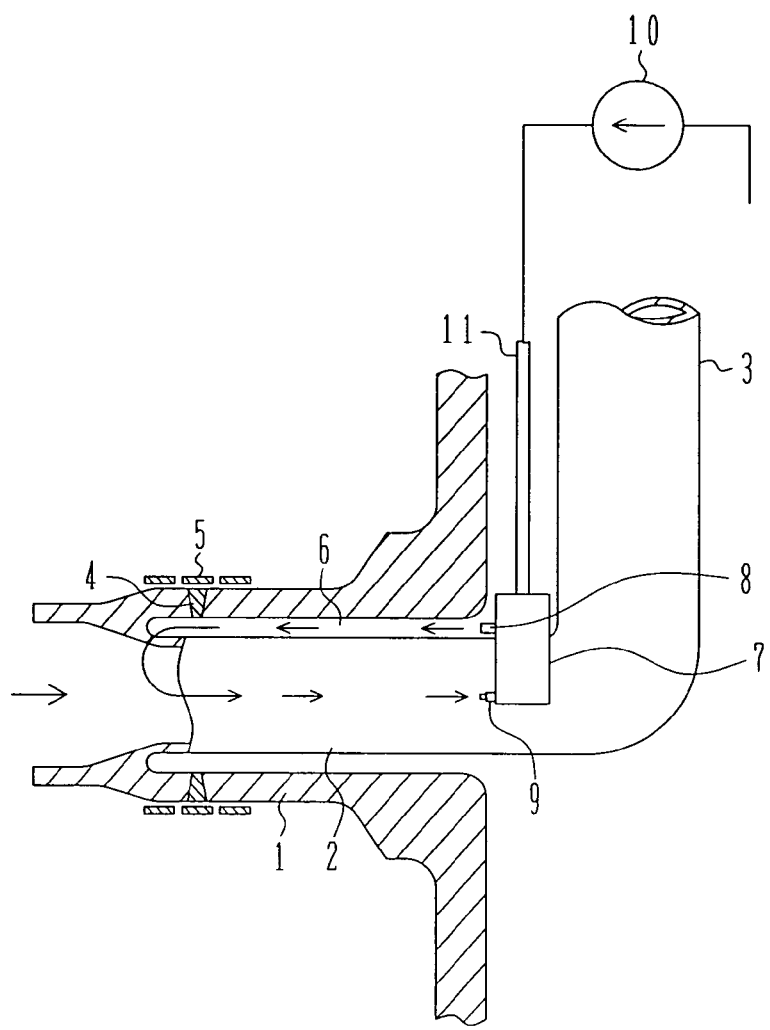
FIG. 5 is a schematic diagram of a piping cooling technique in IHSI according to the present invention.
Figure 5B:
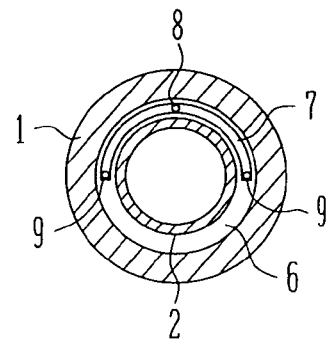
Figure 6A:
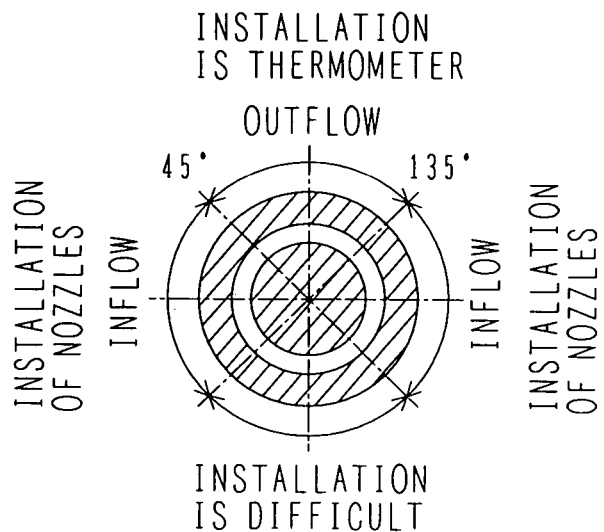
FIGS. 6A and 6B are schematic diagrams of a piping cooling technique in IHSI according to the present invention.
Figure 6B:
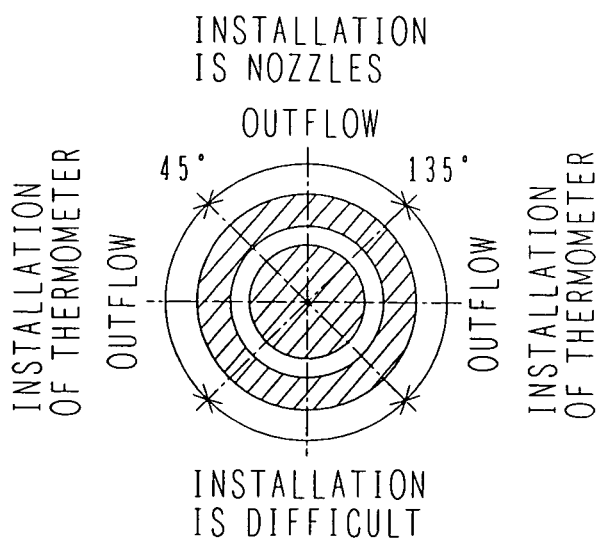

FIG. 5 shows an embodiment in which the layout of the thermometer 9 and the nozzles are mutually interchanged. In this embodiment also, an effect similar to that in FIG. 1 can be obtained. Specifically, fluid flowing into the annular clearance and fluid flowing out therefrom is equal in amount, and hence as shown in FIG. 5, it is necessary to lay out the thermometer and the nozzles so as to be mutually spaced apart. FIGS. 6A and 6B show an example of possible layout method for thermometer and nozzles. As shown in FIG. 2B, since high-temperature fluid stagnates in an upper portion, when the nozzles are arranged in the range within ±45 degrees from the horizontal direction (3 o'clock direction and 9 o'clock direction) shown in FIG. 6A, the range within ±45 degrees from the position of 0 o'clock position at an upper portion becomes an outflow direction, and therefore the thermometer is installed within this range. At this time, however, in the range within ±45 degrees from the position of 6 o'clock in a lower portion, the nozzles or the thermometer is difficult to install. Therefore, when the nozzles are arranged in the range within ±45 degrees from the position of 0 o'clock in an upper portion shown in FIG. 6B, the thermometer is disposed within the range of ±45 degrees from the horizontal direction (3 o'clock direction and 9 o'clock direction). As described above, laying out the thermometer and the nozzles so as to be mutually spaced apart allows an effective measurement of the fluid temperature. Here, the number of nozzles (or a nozzle) are not limited. Also, installation of the thermometer or nozzles in a lower portion (6 o'clock position) does not particularly present a problem, but in this case, the installation is very difficult. Hence, as shown in FIG. 1B, it would be more desirable to arrange the nozzles in the region in the horizontal direction (3 o'clock direction and 9 o'clock direction) and make the direction from 0 o'clock to 6 o'clock an outflow direction, in that the nozzles can be arranged in substantially a symmetrical manner. In other words, by arranging the nozzles substantially symmetrically in the region in the horizontal direction (3 o'clock direction and 9 o'clock direction), the imbalance in the cooling characteristics of the nozzles can be kept to a minimum. This facilitates the evaluation of the temperature distribution, and enhances the cooling effect by suppressing the imbalance of the cooling effect, and thereby enables the annular clearance to be cooled with a minimum flow rate. Moreover, since the high-temperature portion in the annular clearance is located at an upper portion, high-temperature fluid flows out, and the thermometer disposed at an upper portion can measure the temperature with high accuracy. With the direction of flow considered, regarding the outside of the annular clearance (i.e., the outside of intersection points between the outer periphery of the annular clearance and the lines of 45 degrees and 135 degrees), the above-described regions are mutually distinguished by lines extending upward (to the upper side) from the above-described intersection points. Furthermore, it is desirable from a production view point that the thermometer is installed to the cooling apparatus. Also, it would be desirable to install the nozzle on the rear surface, side surface, or bottom surface of the cooling apparatus rather than on the front surface, since flows issued from the annular clearance can easily cross the thermometer on the above-described rear, side, or bottom surface. However, a front surface area that is located higher than the top end of the annular clearance could be used for nozzle installation positions without problem.

Figure 7A:
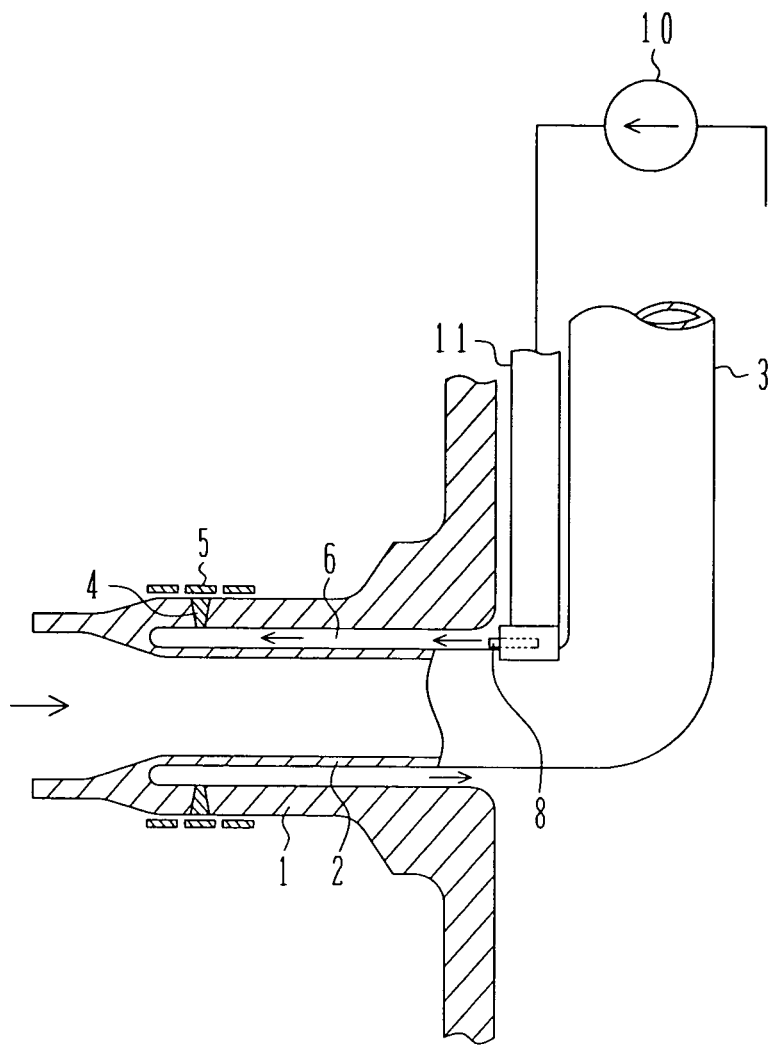
FIG. 7 is a schematic diagram of a piping cooling technique in IHSI according to the present invention.
Figure 7B:
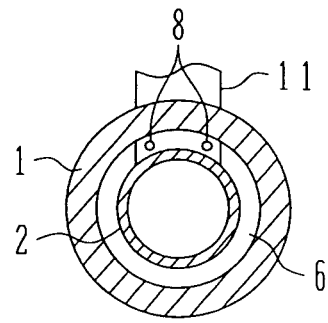
Figure 7C:
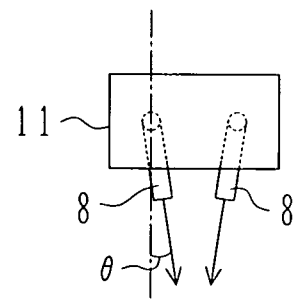
Figure 8A:
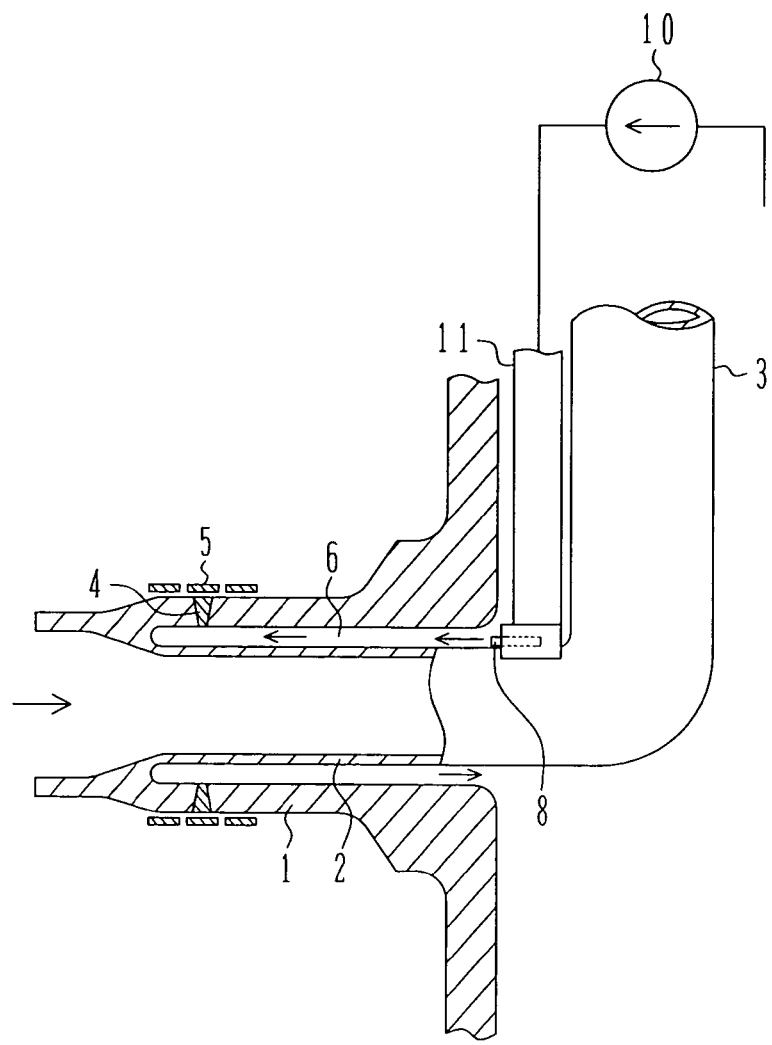
FIG. 8 is a schematic diagram of a piping cooling technique in IHSI according to the present invention.
Figure 8B:
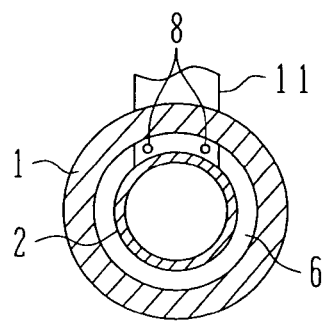
Figure 8C:
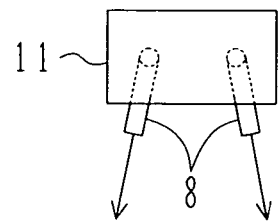

In particular, it is difficult to flow a jet into the narrow annular clearance. Such being the case, a method for efficiently flowing a jet into the narrow annular clearance will be described below. In this embodiment, as shown in FIG. 7, nozzles are installed at an upper portion of a cylinder, are tilted 8 degrees to the direction of the cylinder center line (the line connecting the upper and lower ends the cylinder). This tilting makes it possible to move the area subjected to jetting by the nozzles to the center of the annular clearance, and amplify turbulence from interference between the two jet flows. As a result, because the flow runs around to the lower end of the annular clearance, the cooling effect can be enhanced. Particularly in the model test, a tilt angle of 9 degrees allowed collided jet flows to arrive even at the lower end of the annular clearance, thereby providing optimum cooling. Also, as shown in FIG. 8, by tilting the nozzles to the outside and slightly downward, a similar effect can be obtained. As described above, addition of a tilt component in the tangential direction to the cylinder, which has not been hitherto taken into consideration, also enhances the cooling effect. Further, in this embodiment, tilting of a cylinder center direction component would not present a problem.

Figure 10:
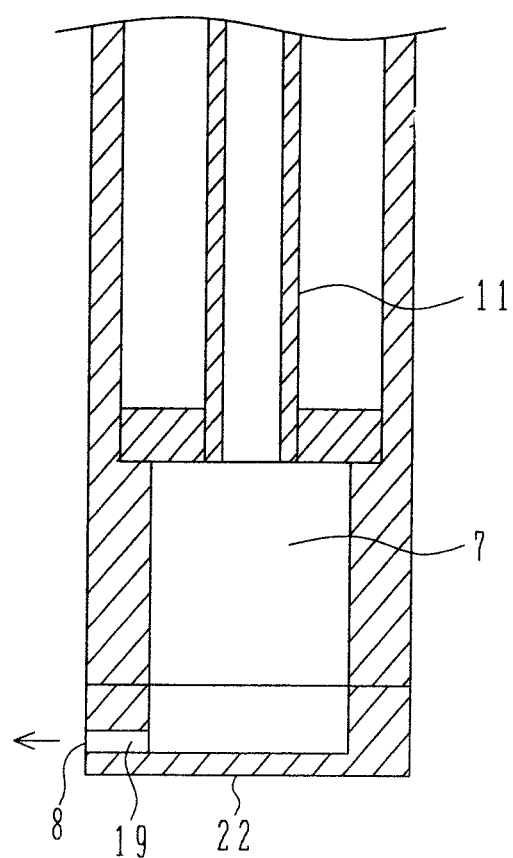
FIG. 10 is a schematic diagram of a piping cooling technique in IHSI according to the present invention.
Figure 11A:
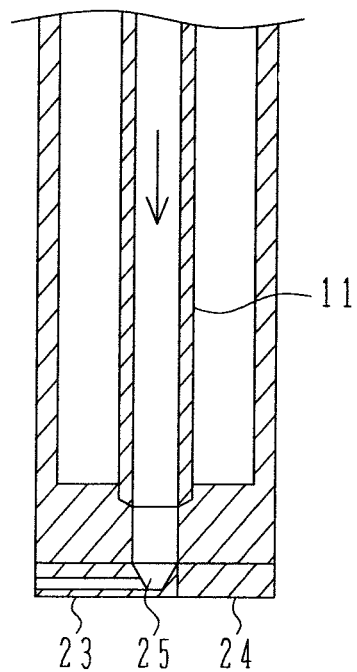
FIGS. 11A and 11B are schematic diagrams of a piping cooling technique in IHSI according to the present invention.
Figure 11B:
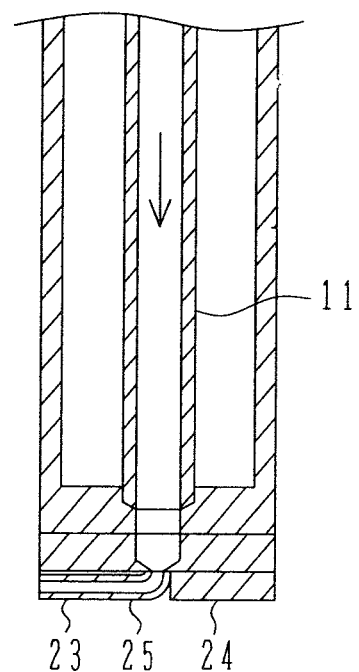
Figure 11C:
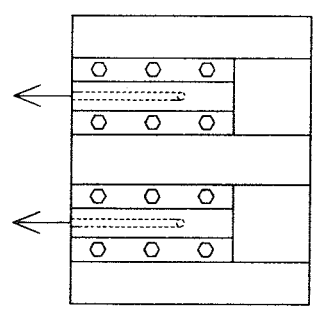
FIG. 11C and 11D are bottom view diagrams of the piping arrangements shown respectively in FIGS. 11A and 11B.
Figure 11D:
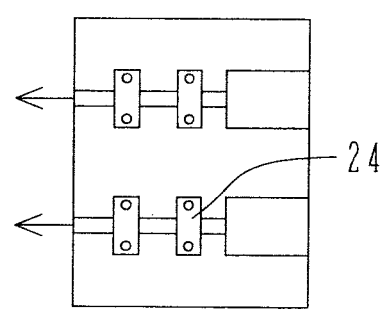

FIGS. 9 to 11 are diagrams showing embodiments regarding the nozzle portions of the cooling apparatus. These diagrams are depicted with reference to FIGS. 7 and 8. In each of FIGS. 7 and 8, nozzles are actually tilted, but here, for convenience in explaining, these diagrams are referred to, on the assumption that the nozzles are not tilted. The nozzle portion of the cooling apparatus shown in FIG. 9 is characterized in that, regarding a cooling apparatus using an induction heating stress improvement method, in a structure constituting the bottom of a cooling apparatus in the vicinity of the inner cylinder 22 of an N2 nozzle, there is provided a hole open at one end to form a flow path exit (nozzle) from which a coolant is to outflow, and that the coolant is flowed from the flow path exit into the annular clearance, to promote cooling effect. In this embodiment, a narrowed portion 19 having a cross-sectional area decreasing toward an exit direction of the nozzle is provided in order to accelerate a fluid. An ordinary narrowed portion or enlargement portion is axisymmetric, and hence the distance between the bottom surface and the nozzle center is large in the minimum area portion thereof, so that it is impossible to flow jet flows into the narrow annular clearance. In this embodiment, particularly for the purpose of flowing jet flows into the flow path of the narrow annular clearance, the upper portion of the nozzle is greatly narrowed, with the cross-sectional area in the upper portion significantly changed, and the lower portion thereof is formed into a non-axisymmetric shape such as to retain a substantially flat shape. This provides a structure allowing an achievement of optimization of a coolant jetting position, thus ensuring the issuing of jets into the narrow annular clearance. Moreover, by virtue of the above-described shape, flows are directed toward the center of the inner cylinder, so that the direction of flows can be controlled, a further effect. Here, possible narrowed portions include, e.g., an orifice-shaped one. The structure in which a hole for the nozzle is formed, may be made up by combining some components, besides it constitutes a single-piece construction.

FIG. 10 shows an embodiment characterized in that a header tank 7 is arranged on the bottom surface; a plurality of flow paths forming outflow openings (nozzles) 8 for allowing a coolant to flow out is formed at substantially the lowermost end of the header; and the coolant is flowed into the annular clearance to promote cooling effect. This embodiment, therefore, has a structure effective in providing a large number of nozzles 8 with respect to the header tank. It is further desirable that the nozzles be replaceable. Also, by this embodiment, the number of pipes for conveying the coolant can be reduced. Furthermore, since fluid pressure operating on each nozzle is rendered uniform, fluid amount control with respect to each nozzle can be easily performed. In addition, the above-described features allow jets to flow into the narrow annular clearance.

FIG. 11 is an embodiment wherein, in the nozzle portion of the cooling apparatus, a tube or a small structure 23 is partially arranged on the bottom surface of the cooling apparatus. Under normal circumstance, a tube without bend would be arranged on the side surface of the structure, but the problem associated with the N2 nozzle cannot solved by such a method because of a large wall-thickness of the structure and the presence of a mounting portion of the tube. The tube and the structure provided on the bottom surface, according to this embodiment has bent flow paths, and a connection portion for connecting the tube is configured so as not to be located on the undersurface. Here, a bent portion refers to a flow path for changing the direction of flow. This tube, having a large wall-thickness and high strength, and being inexpensively producible, it is particularly desirable. Consequently, by the present embodiment, this tube allows the inflow of jet into an especially narrow annular clearance. Regarding the present tube, by providing a fixing structure 24 for preventing oscillation and reducing hydraulic reaction force, problems such as oscillations and the like can be solved. Providing such a small tube or structure on the bottom surface allows the nozzle to be replaced or repaired due to clogging from erosion or foreign matter. Moreover, since it is a small structure arranged on the bottom surface, the present structure can efficiently flow jets into the narrow annular clearance. Furthermore, in the bend portion, jet flows run at a high flow speed on the outside thereof under centrifugal force, so that the jet constitutes a flow along the inner cylinder, thereby enhancing the convection in the annular clearance. The tube may be made of a metal, but can also be made of an organic compound, such as Teflon®, which can improve productivity. In this embodiment, nozzles are integrated with each other, and can also be removed from the main body of the apparatus.

Figure 12A:
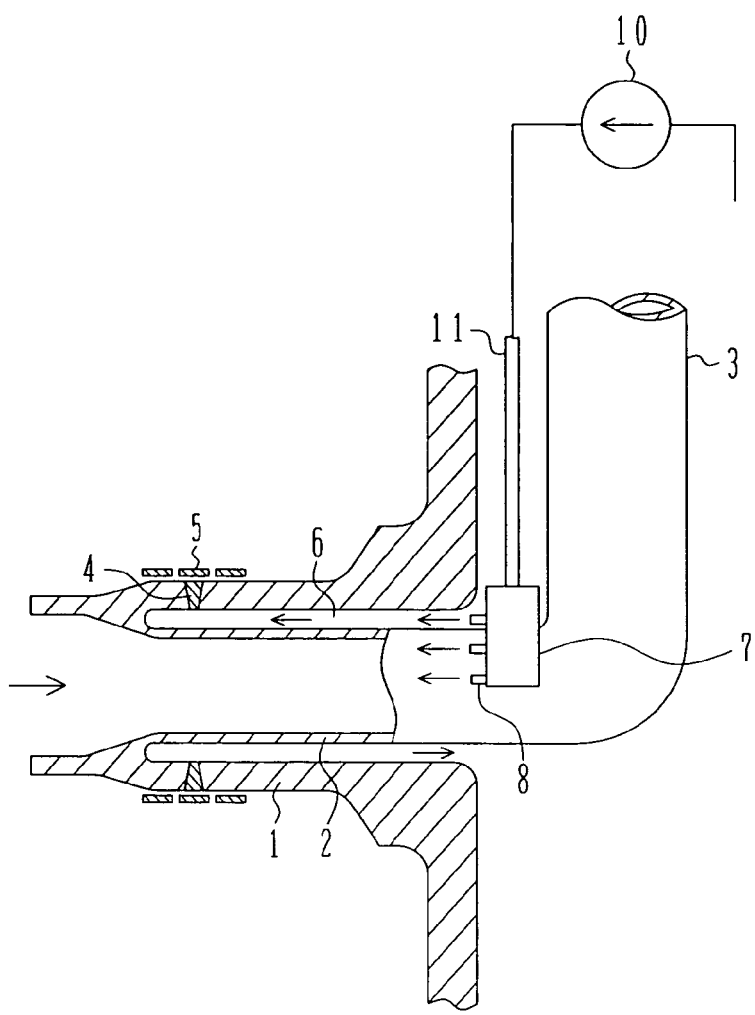
FIG. 12 is a schematic diagram of a piping cooling technique in IHSI according to the present invention.
Figure 12B:
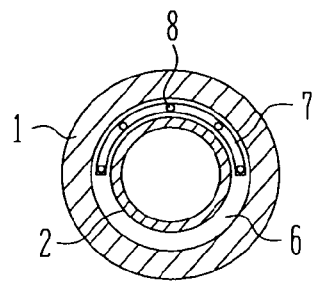

As shown in FIG. 2A, under natural convection, high-temperature fluid moves to an upper portion of the annular clearance while low-temperature fluid moves to a lower portion thereof. In particular, in an upper portion of the annular clearance, high-temperature water stagnates. Therefore, installing the nozzles at the upper portions and stirring the high-temperature water would provide effective cooling. In particular, as shown in FIG. 12, by providing a plurality of nozzles in a saddle-shaped tank, it is possible to efficiently blow jets into a high-temperature water portion. Also, installing jet nozzles with nozzle tips which create rectlinearly spouting jet flows produces a higher effect. Additionally, a guide, a roller, or the like may be arranged in the saddle-shaped tank to facilitate the positioning/layout of the nozzles.

Figure 13A:
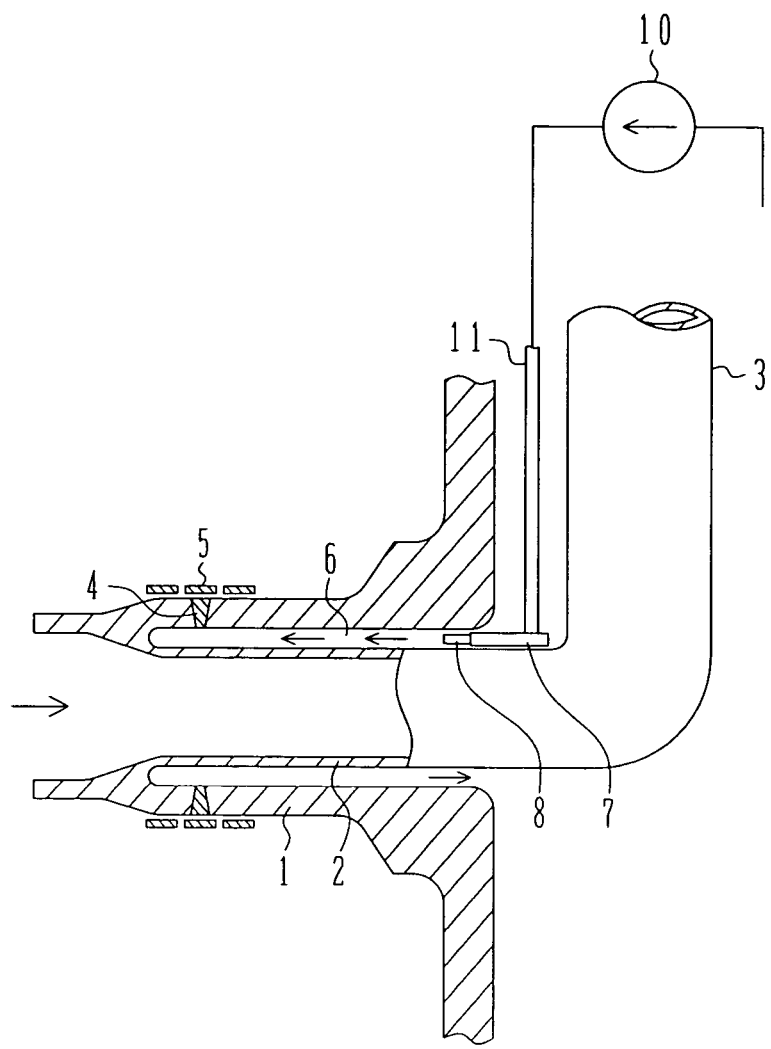
FIG. 13 is a schematic diagram of a piping cooling technique in IHSI according to the present invention.
Figure 13B:
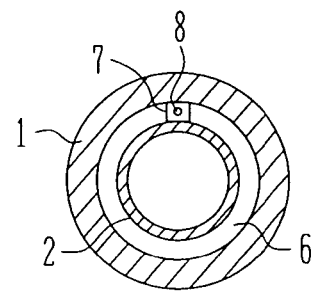

In an embodiment shown in FIG. 13, a one or more nozzle tips are inserted into the annular clearance, and thereby an effective jet is flowed into the annular clearance. With nozzles provided in the reactor, the entire jet flows from the nozzles could not necessarily be flowed into the annular clearance. However, the present embodiment enables the entire jet flows to be flowed into the annular clearance. Furthermore, this embodiment used in combination with other embodiments can provide an enhanced effect. Also, a thermometer inserted into the annular clearance provides improved measurement accuracy. In this case, if the nozzles are installed within the range of ±45 degrees with respect to the horizontal direction (direction from 3 o'clock to 9 o'clock) about the position of the riser pipe, then a larger insertion distance would be obtained.

Figure 14A:
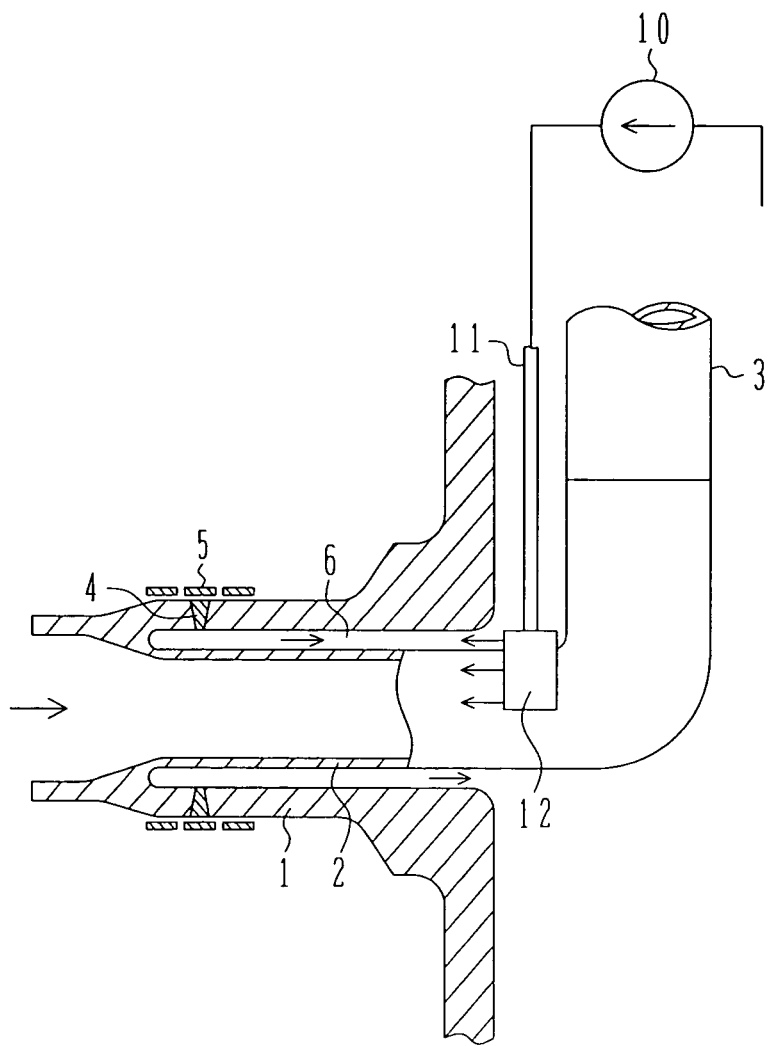
FIG. 14 is a schematic diagram of a piping cooling technique in IHSI method according to the present invention.
Figure 14B:
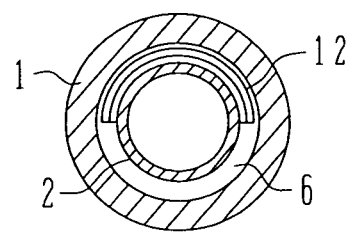
Figure 14C:
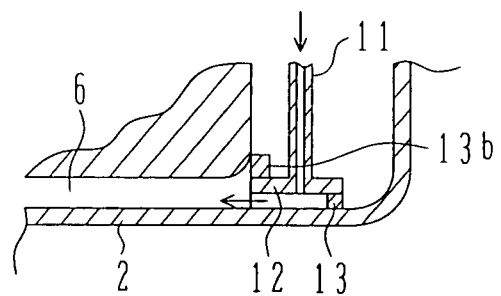

FIG. 14 shows an embodiment in which a pad 12 is used. If the spacing of the annular clearance is very small and flow issued from the nozzles cannot be efficiently flowed into the annular clearance, this technique is effective because it does not require the thick-wall portion at the lower end. In this case, in order to guide flows into the annular clearance, it is advisable to install, at a proper location, a sealant 13 for preventing leakage to the outside of the annular flow path. This technique can generate flows along the thermal sleeve 2, thereby producing a forced convection desirable for the annular clearance. In the embodiment shown in FIG. 13, an additional installation of a sealant 13b on the piping side would produce a larger leakage prevention effect.

Figure 15A:
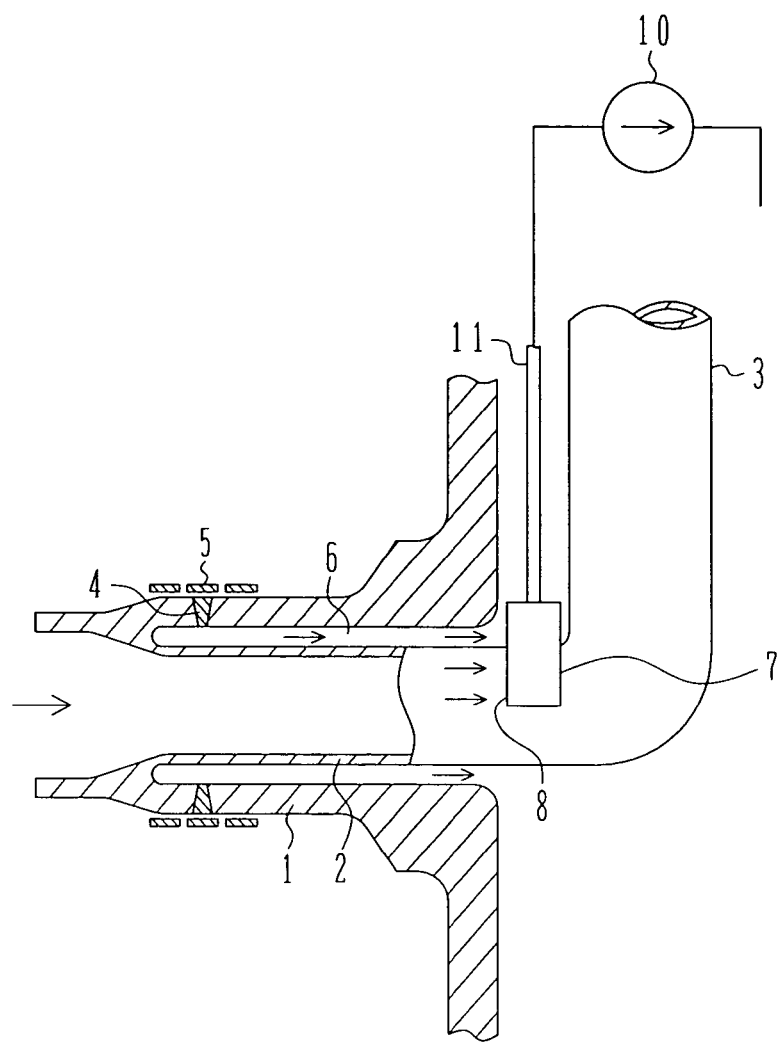
FIG. 15 is a schematic diagram of a piping cooling technique in IHSI according to the present invention.
Figure 15B:
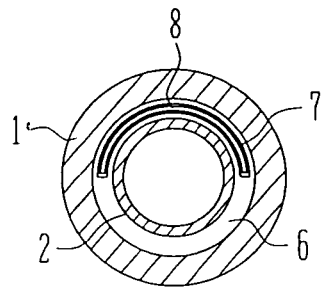

FIG. 15 shows an IHSI method for promoting the cooling effect with respect to the annular clearance by flows generated by suction. This embodiment exerts an effect particularly in the cases where the annular clearance is narrow. Also, unlike jet flows as local flows, a suction flow promises to produce a stable high cooling effect. Moreover, installation of the thermometer 9 in the suction pipe allows for high-accuracy measurement.

Figure 16:
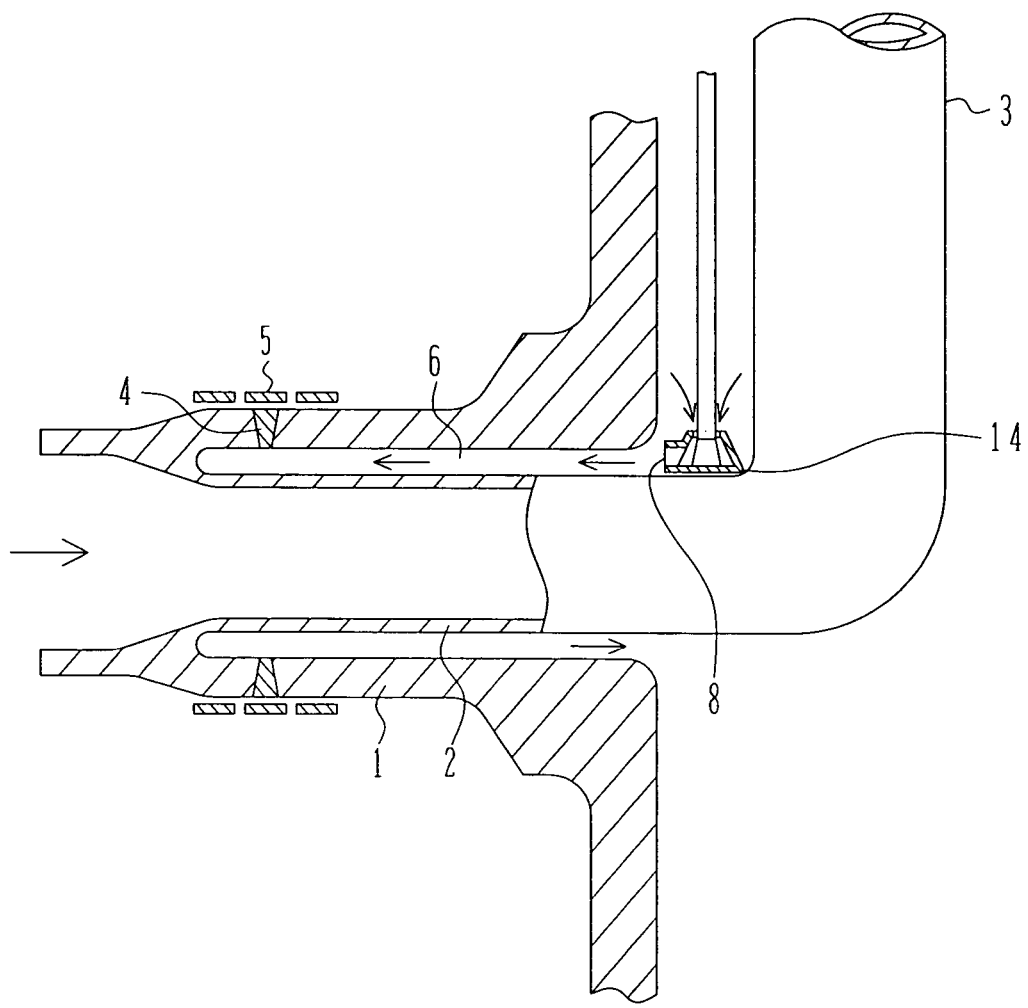
FIG. 16 is a schematic diagram of a piping cooling technique in IHSI according to the present invention.

FIG. 16 shows an embodiment in which the annular clearance is cooled by a submerged pump 14. In this case, the piping and external circulation pump become unnecessary, and the construction is simplified. Even if flows are excited by moving the structure in the vicinity of the nozzle N2, the above-described simplification of construction allows similar cooling effect to be obtained.

Figure 17:
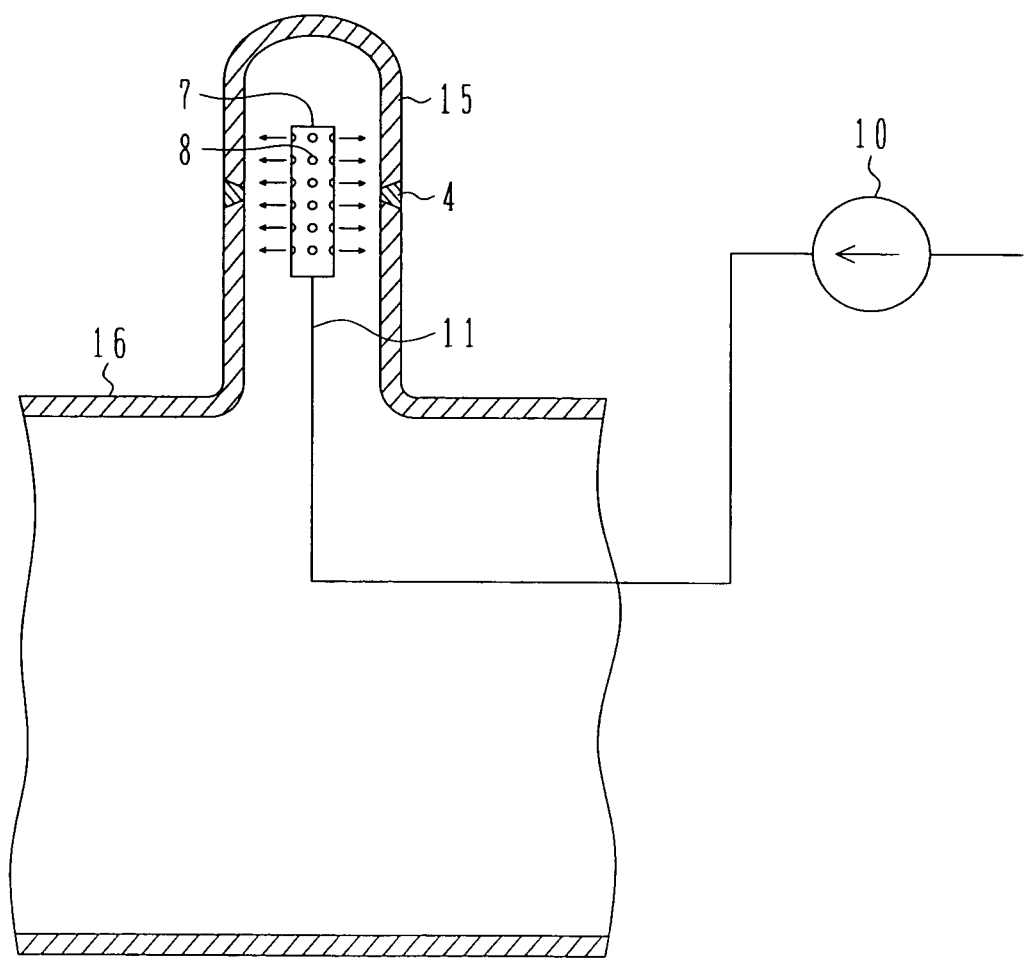
FIG. 17 is a schematic diagram of a piping cooling technique in IHSI according to the present invention.

In the PLR piping, there is a possibility that the cooling of the nozzle to decontaminate may cause a problem besides the cooling of the N2 nozzle. FIG. 17 shows an embodiment in which IHSI is applied to the nozzle to decontaminate 15. In this case, it is impossible to insert nozzles into water in the enclosed pipe. This being the situation, in this embodiment, after having decomposed the PLR piping, valves connected thereto, or the PLR pump, the nozzles 8 are inserted into PLR main piping 16. Consequently, air could flow inside the piping. In the air, nozzles in limited direction cannot perform cooling, and therefore as shown in FIG. 17, it is necessary to arrange a large number of nozzles (pores), and radially flow water from the plurality of nozzles toward the inner surface of heated piping.

Figure 18:
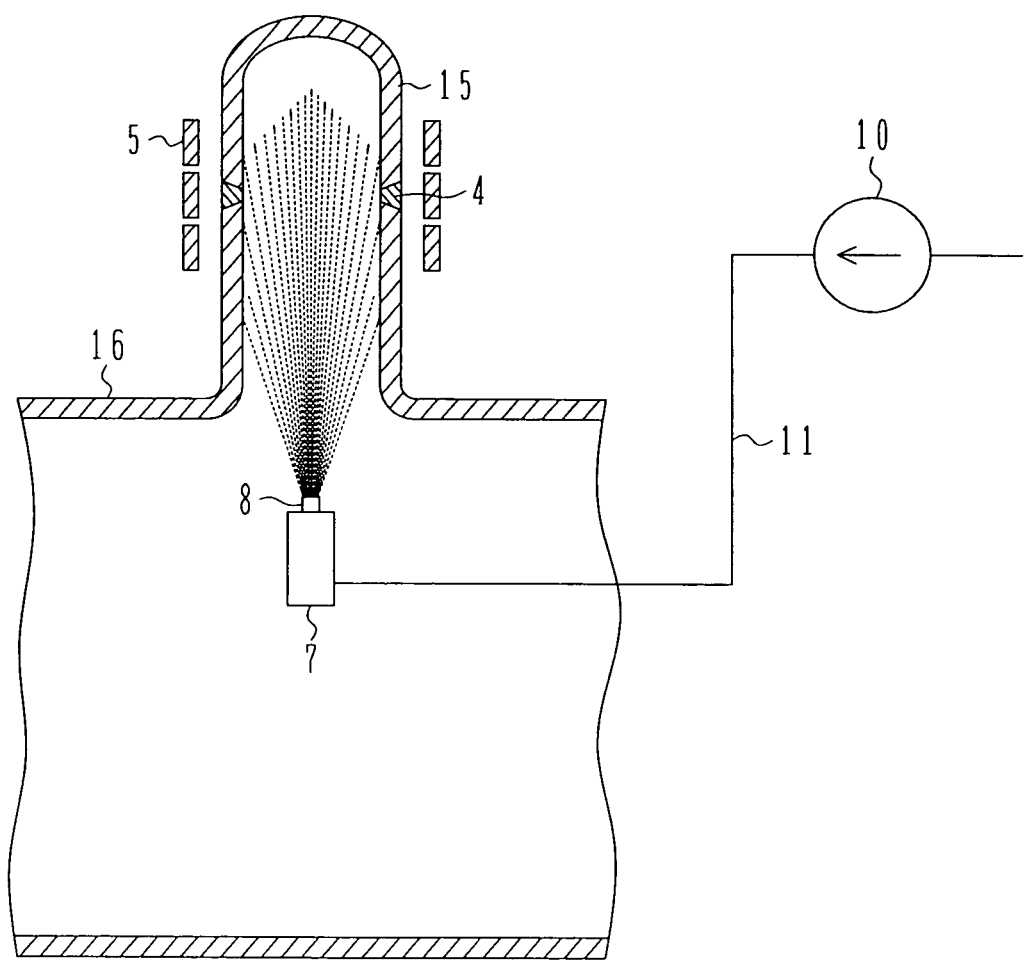
FIG. 18 is a schematic diagram of a piping cooling technique in IHSI according to the present invention.

FIG. 18 shows an embodiment in which IHSI is applied to the nozzle to decontaminate 15, as well. When it is difficult to move nozzles into the nozzle to decontaminate 15, it is necessary to spout water flows from the PLR piping toward the nozzle to decontaminate 15, with the water flows spread in a spread or conical shape.

Figure 19:
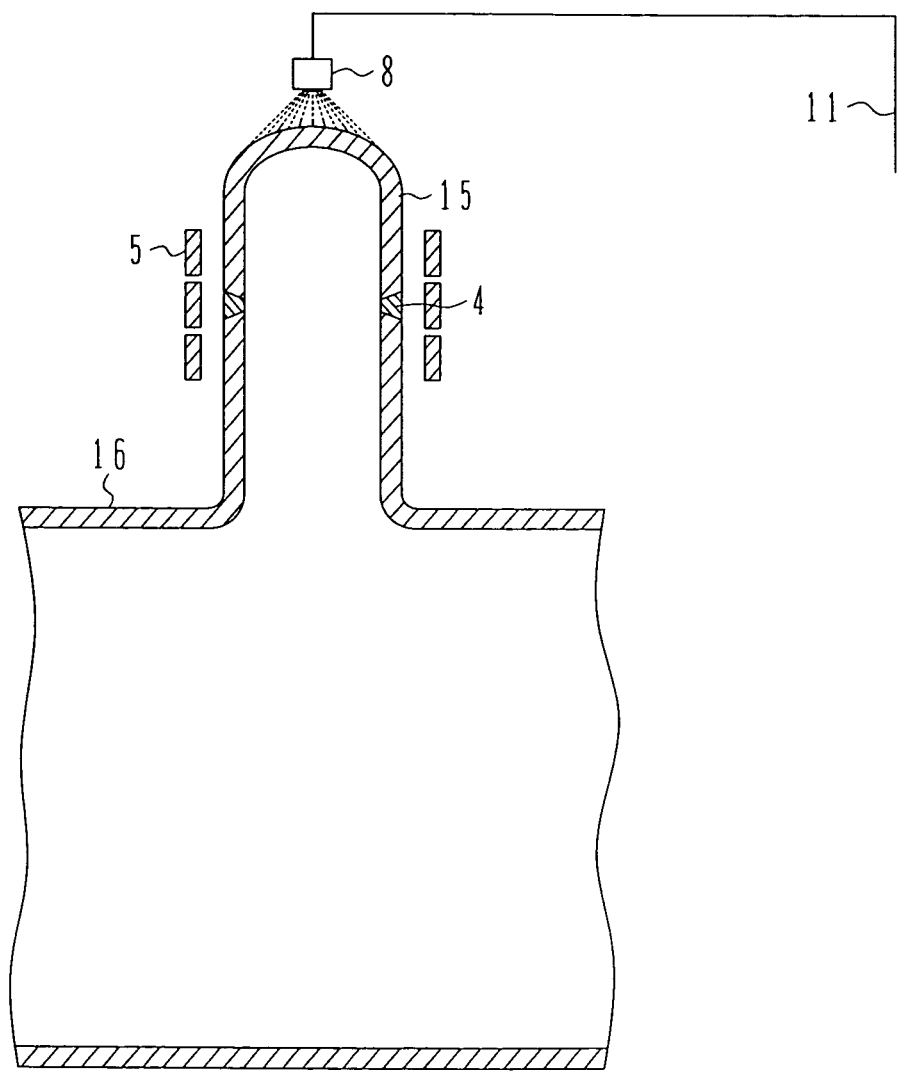
FIG. 19 is a schematic diagram of a piping cooling technique in IHSI according to the present invention.

FIG. 19 shows a method for performing a cooling operation from the outer surface of the piping. When the cooling apparatus cannot be inserted into the PLR piping, the cooling can be conducted from outside of the piping. In this embodiment, possible coolants include liquids and gases, including water, nitrogen, argon, etc. Particularly, in order to reduce the base temperature of the piping, cooling by liquid nitrogen produces a large effect and improves operability. Also, previously cooling the piping and the inside thereof before the execution of the IHSI operation, i.e., cooling them before heating them by a heater makes it possible to increase, even in a small quantity, the temperature difference between the inside and outside of the piping, thereby bringing about further effectiveness. The technique according to this embodiment can be similarly utilized in other places including the N2 nozzle.

It has been verified by a computational fluid dynamics analysis that the increase in the number of revolutions of the pump in the PLR piping enables the cooling of the nozzle to decontaminate 15. In ordinary practice, IHSI operation is executed at a minimum pump revolution corresponding to a 20% flow rate, but at a pump revolution corresponding to a 25% flow rate or more, the supply flow of the coolant increases. As a consequence, as indicated by the results of the computational fluid dynamics analysis, it is clear that the fluid temperature in the nozzle to decontaminate 15 reaches its saturation temperature. However, in the PLR piping in the reactor, a flange or an air vent cannot be installed from the viewpoint of safety ensuring and leakage prevention, so that air might stagnate in the nozzle to decontaminate 15. Unless air in the nozzle to decontaminate 15 can be eliminated, this embodiment could not be implemented.

Figure 20A:
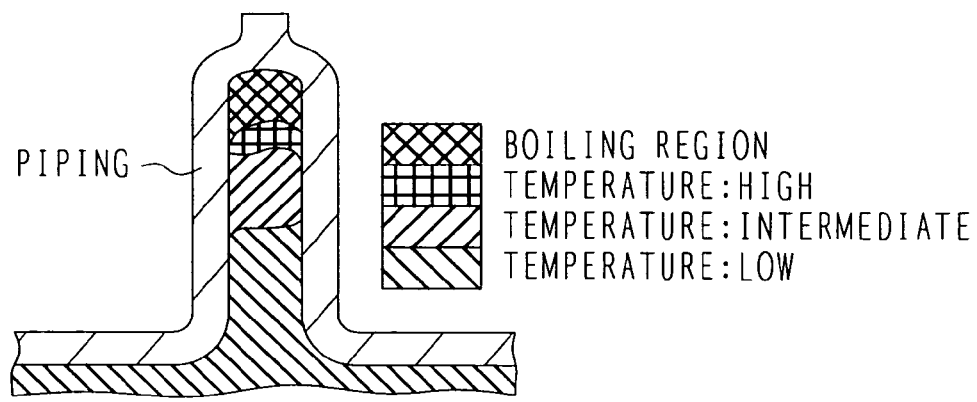
FIGS. 20A and 20B are schematic diagrams of analysis results of temperature distribution in a nozzle to decontaminate.
Figure 20B:
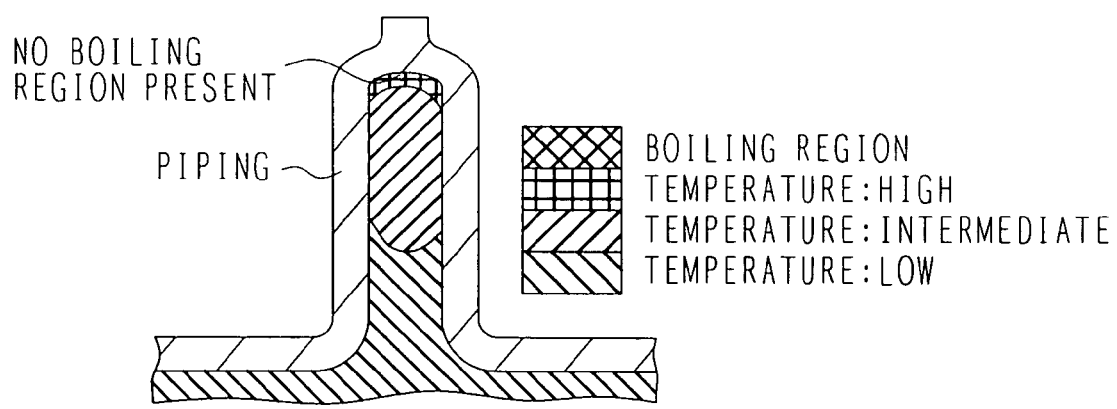
Figure 21A:
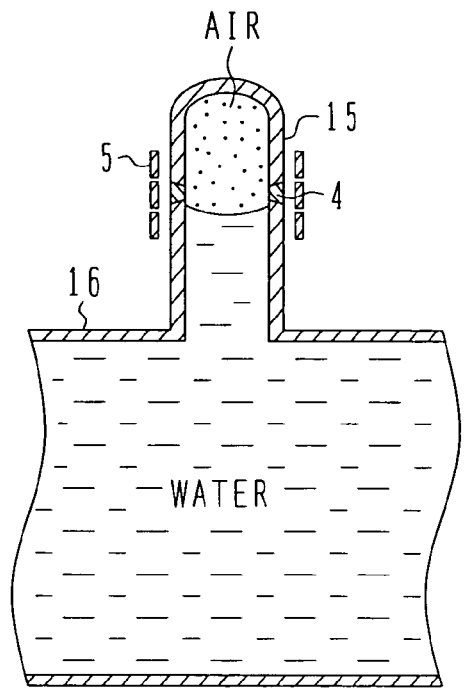
FIGS. 21A to 21D are schematic diagrams explaining a principle of air removal technique in the induction heating stress improvement according to the present invention.
Figure 21B:
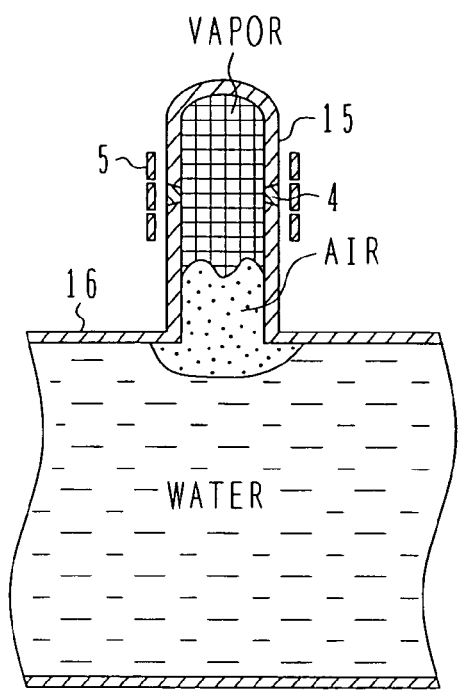
Figure 21C:
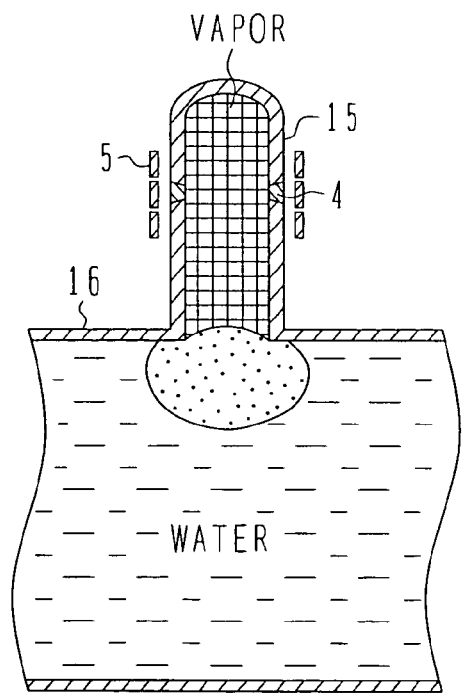
Figure 21D:
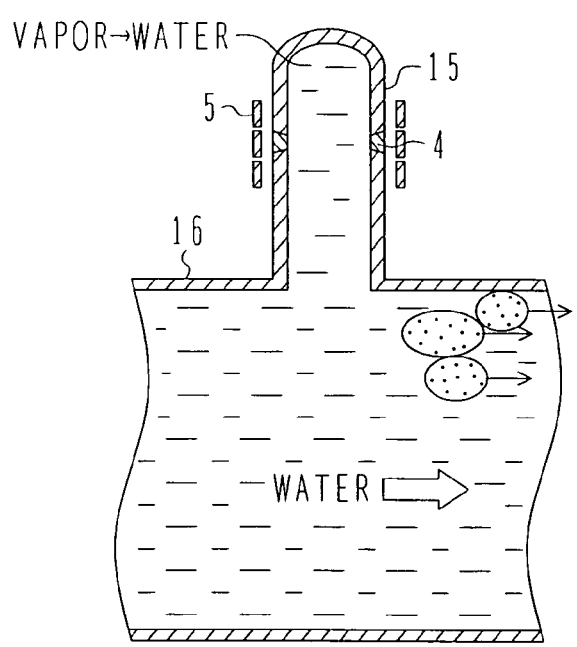
Figure 22:
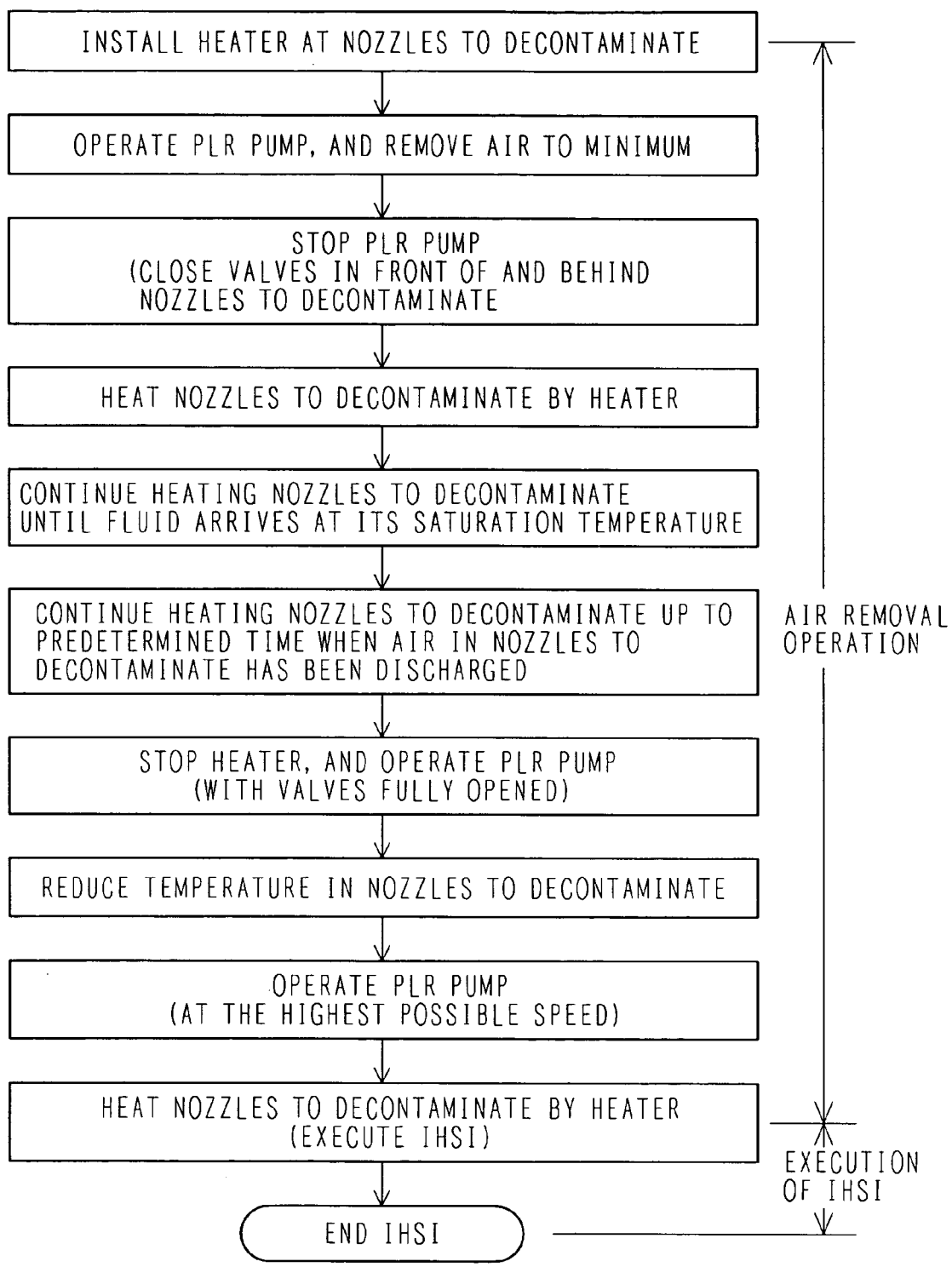
FIG. 22 is a flowchart of implementation procedure of the air removal technique in IHSI according to the present invention.

As a method for removing air, the present invention executes the following means in an order of A→B→C→D as shown in FIG. 21. Furthermore, FIG. 22 shows an operational procedure. The area that most requires the removal of air is the nozzle to decontaminate. In general, non-condensing gas such as air, having a low density, stagnates at an upper portion of the nozzle to decontaminate 15 as shown in FIG. 21A, so that air cannot be removed by water flows. Non-condensing gas such as air has a low thermal conductivity and heat transfer coefficient, and exerts a significant detriment to the execution of IHSI. In the present invention, the removal of air was performed using the following procedure. First, air that can be removed by water flows is eliminated by operating the PLR pump. Unlike an occasion when IHSI is executed, the PLR pump is stopped, or operated at a low revolution to facilitate the boiling of water. Then, the nozzle to decontaminate 15 is heated. The order between the stopping the PLR pump and the heating of the heater may be reversed. The heating may be performed using a heater to be employed for the execution of IHSI, or another heater. For example, in the case where a pressure in the piping is about 0.25 MPa, when water in the piping arrives at its saturation temperature of 400 K, water evaporates as shown in FIG. 21B, and a vapor forms. At this time, a reduction in the opening of valves in front of and behind the nozzle to decontaminate, further facilitates boiling inside the nozzle to decontaminate. The density of the water vapor under the above-described temperature and pressure conditions is approximately 1.37 kg/m$^2$, which is clearly smaller than the air density of 2.18 kg/m$^2$. Consequently, stagnant air in an upper portion is gradually pushed out by water vapor. That is, because the evaporation of water increase the volume of the water by a factor of 1000, occurring water vapor easily pushes out the air inside the nozzle to decontaminate. As a result, as shown in FIG. 21C, the nozzle to decontaminate is filled with water vapor. Next, with the heater stopped and the output reduced, when the PLR pump is operated to increase the flow rate, the air is carried off and the cooling effect is improved, whereby the water vapor decreases in temperature to thereby start to condense, as shown in FIG. 21D. When the water vapor decreases in temperature, it is subjected to a state change into water, so that the nozzle to decontaminate is filled with water. As a consequence, non-condensing gases, air, and the like can be completely removed from the nozzle to decontaminate. The state shown in FIG. 21D can be achieved by increasing the flow rate of the PLR pump without the need to stop the heater to reduce the output. Also, we can serve the purpose only by heating the heater. Here, the order between the operation of the PLR pump and the stop of the heater may be reversed. With the pump operated at the highest possible speed, the nozzle to decontaminate is overheated by the heater to execute IHSI. The order between the high-speed operation of the PLR pump and the heating of the heater may be reversed, although it is undesirable. Thus, it is possible to implement a reliable IHSI execution in a state in which air becomes stagnant in portions of the nozzle to decontaminate and is necessary to be completely removed. When executing IHSI, it is necessary to enhance the cooling effect to suppress boiling, but when removing air, it is necessary to generate boiling to suppress the cooling effect. Therefore, the revolution of the pump, the flow rate in the piping, and the opening of the valves are different between the time when executing IHSI and the time when removing air. As shown in FIG. 20A, under an operation at a 20% flow rate design rating, the inside of the nozzle to decontaminate 15 comes to a boil, so that the possibility of being able to execute IHSI is uncertain. The heating of the nozzle to decontaminate under a 20% flow rate or less design rating is considered to be a result of utilizing the present invention.

As is known, the fluctuating of the flow causes a disturbance to a thermal boundary layer that has grown in a stable manner, and can thin the thermal boundary layer, as well as providing a fluid with a relatively high heat transfer coefficient. By adjusting the revolution of the PLR pump and/or the valve opening, it is possible to provide an upstream side flow with a time-varying disturbance, and vary the flow rate and pressure to increase the heat transfer coefficient and circulation amount of water. Even when the air is stagnant in the nozzle to decontaminate, means for varying the flow rate and pressure is an effective method for removing the accumulated air. However, it is difficult to totally remove air only by varying the flow rate.

Figure 23A:
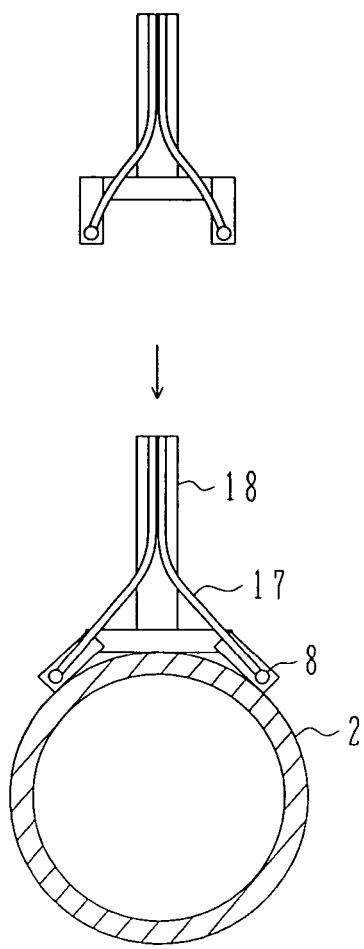
FIG. 23 is a schematic diagram of a piping cooling technique in IHSI according to the present invention.
Figure 23B:
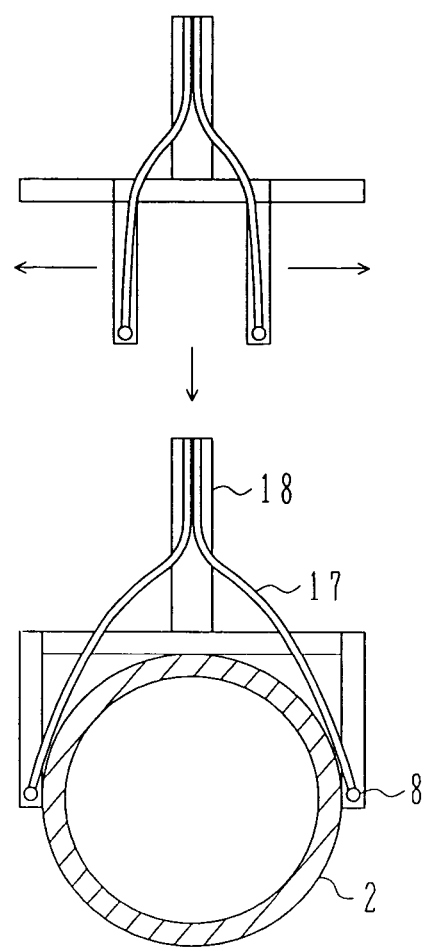

When installing the cooling apparatus at an appropriate place, it is necessary to allow for the case where the piping has slight asperities, the case where it has slightly elliptic shape, and the case where individual piping sizes are diverse. Herein, as shown in FIG. 23, the nozzle position must be variable, and the nozzle installation portion must be configured so that shape-variable tubes 17 and a support structure 18 are formed in one portion of the piping. In the case where the piping has slight asperities, the case where it has slightly elliptic shape, and the case where individual piping sizes are diverse, the positioning accuracy with respect to the nozzle position from which cooling water is to be supplied, and temperature measurement position are improved. As a result, proper cooling is achieved. Also, as shown in FIG. 1, when installing the nozzles in the horizontal direction, since there is a possibility of moving the nozzles, the present invention produces the cooling effect.

The above-described descriptions have focused on the cooling methods for the N2 nozzle and nozzle to decontaminate, for which the cooling conditions are severe when applying IHSI to the PLR piping as described above. However, these cooling methods are ones applicable to all other portions of the PLR piping, such as a crosshead portion, ring header end cap portion, takeoff bifurcation portion, tie-in portion of valves and pump, welding portion, which are structure-discontinuous portions with respect to other straight runs of pipe.

The above-described embodiments can be applied to multiple pipes such as a feedwater nozzle, recombination T piping, low-pressure water injection nozzle, reactor core spray nozzle, and the like.

The above-described devices are guided by remote control, and hence, by installing sensors, cameras, or the like capable of verifying whether jet nozzles have been able to provided at predetermined positions, defects can be prevented when applying IHSI to an actual machine. In particular, it is necessary to verify whether cooling nozzles can be installed to the annular clearance of the N2 nozzle.

Moreover, observation of the annular clearance by miniature CCD (charge-coupled device) camera and video, pressure sensors, and the like allows the verification of boiling conditions and cooling effect.

On the other hand, as another example of conventional art, there is an induction heating stress improvement method disclosed in Japanese Patent No. 2624649. In this conventional art, partial water flows are formed by concentratedly spouting cooling water toward a base portion in an upper portion, and the N2 nozzle outer surface surrounding an annular space is heated to give a temperature difference to the nozzle wall, whereby residual stress is relaxed.

The above-described conventional art does have an enhanced cooling effect, but has given no consideration to the verification of a cooling effect when applying IHSI to an actual machine. In order to generate a flow by jetting a fluid into the narrow annular clearance of a N2 nozzle, the jet nozzles must be installed at predetermined positions with high accuracy. However, since structures of the actual machine have manufacturing tolerances, the outer surfaces thereof might not be a perfect circle in the cross-section thereof. Additionally, the cooling apparatus must be inserted from a distant place above the pressure container of a reactor. It is therefore difficult to install the cooling apparatus at a predetermined location in the reactor. Also, there is a possibility that the jet nozzles may not be directed toward predetermined directions. Hence, it is necessary to verify and monitor, during or before application of IHSI to an actual machine, in regards to whether the jet flows have sufficiently flowed into the annular clearance to meet the desired cooling performance. If the cooling is insufficient, the cooling apparatus must be reset to a proper location.

In the above-described conventional art, since water flows are concentrated at an upper portion, the flow velocity is lower at the side surface and a lower portion of the N2 nozzle than at the upper portion. The cooling performance is related to the magnitude of flow velocity; the larger the flow velocity, the higher the resulting cooling effect. This creates a possibility that the cooling performance decreases at the side surface and the lower portion where the flow velocity decreases.

At the portions with cooling performance reduced, hot spots (local portions with high temperature) occur, so that a reduction in IHSI effect is predicted.

Therefore, in applying IHSI to the N2 nozzles or the like with a narrow annular clearance, there occurs challenges as follows: 1) monitoring the cooling performance when executing IHSI, and 2) ensuring uniform cooling performance.

In the conventional arts, metal temperatures have been measured to check IHSI execution status. However, there has been a possibility that it cannot be determined, by the measurement of metal temperature, whether the cooling performance is sufficient up to a burnout (film boiling). To solve this problem, in the present invention, a thermometer is installed in or around the IHSI cooling apparatus to measure the fluid temperature during IHSI operation. In other words, fluid temperature is used as an index of the cooling performance.

On the other hand, when measuring fluid temperature, it is necessary to raise the temperature after having cooled a heated portion and measure the temperature of an outflowing fluid. Here, since a thermometer is inserted in a complicated reactor, the range within which the thermometer can be installed is limited. This being the case, by tests and a computational fluid dynamics analysis, the present inventors examined the relationships among the installation positions of jet nozzles, that of the thermometer, and the outflow direction of the fluid. The results are shown in Table 1.

TABLE 1

| Jet nozzle installation positions | Thermometer installation position | Outflow direction of fluid | Examinations | Assessment |
|---|---|---|---|---|
| Upper Portion | Upper portion | Lower portion | Fluid outflow direction and thermometer installation position are mutually different | X |
| Upper portion | Horizontal | Lower portion | Fluid outflow direction and thermometer installation position are mutually different | X |
| Upper Portion | Lower portion | Lower portion | Not suited for measurement of high-temperature fluid | X |
| Lower portion | Upper portion | Upper portion | It is difficult to install jet nozzles at lower portions | X |
| Lower Portion | Horizontal | Upper portion | Fluid outflow direction and thermometer installation position are mutually different | X |
| Lower Portion | Lower portion | Upper portion | Fluid outflow direction and thermometer installation position are mutually different | X |
| Horizontal (1 place) | Upper portion | Horizontal | Fluid outflow direction and thermometer installation position are mutually different | X |
| Horizontal (1 place) | Horizontal | Horizontal | Not suited for measurement of high-temperature fluid | X |
| Horizontal (1 place) | Lower portion | Horizontal | Fluid outflow direction and thermometer installation position are mutually different | X |
| Horizontal (2 or more places) | Upper portions | Upper and lower portions | Optimum | ○ |
| Horizontal (2 or more places) | Horizontal | Upper and lower portions | Fluid outflow direction and thermometer installation position are mutually different | X |
| Horizontal (2 or more places) | Lower portions | Upper and lower portions | Not suited for measurement of high-temperature fluid | X |

Since high-temperature water moves upward, in order to measure higher fluid temperatures, the thermometer must be disposed at an upper portion. Also, in order to measure the temperature of the fluid of which the temperature has been raised by cooling the heated portion, the outflow direction of the fluid and the installation position of the thermometer must be the same. Moreover, it is difficult to dispose the thermometer and the jet nozzles at lower portions. From the above-described studies, the present inventors have found out, as new findings, that disposition of jet nozzles at two places or more in the horizontal direction, as well as disposition of the thermometer at an upper portion, enable IHSI execution and monitoring by an optimum fluid temperature measurement (See Table 1).

In advance (i.e., before executing IHSI), the relationship between the fluid temperature distribution in the annular clearance and the temperature of fluid flowing out therefrom can be determined by a computational fluid dynamics analysis and tests. If the temperature measured by the thermometer is the determined temperature, it is considered that the heated surface is being cooled by the jet nozzles under a forced convection. On the other hand, if the temperature measured by the thermometer is shifted from the determined temperature, it is considered that the forced convection by the jet nozzles is not effectively working.

Figure 24:
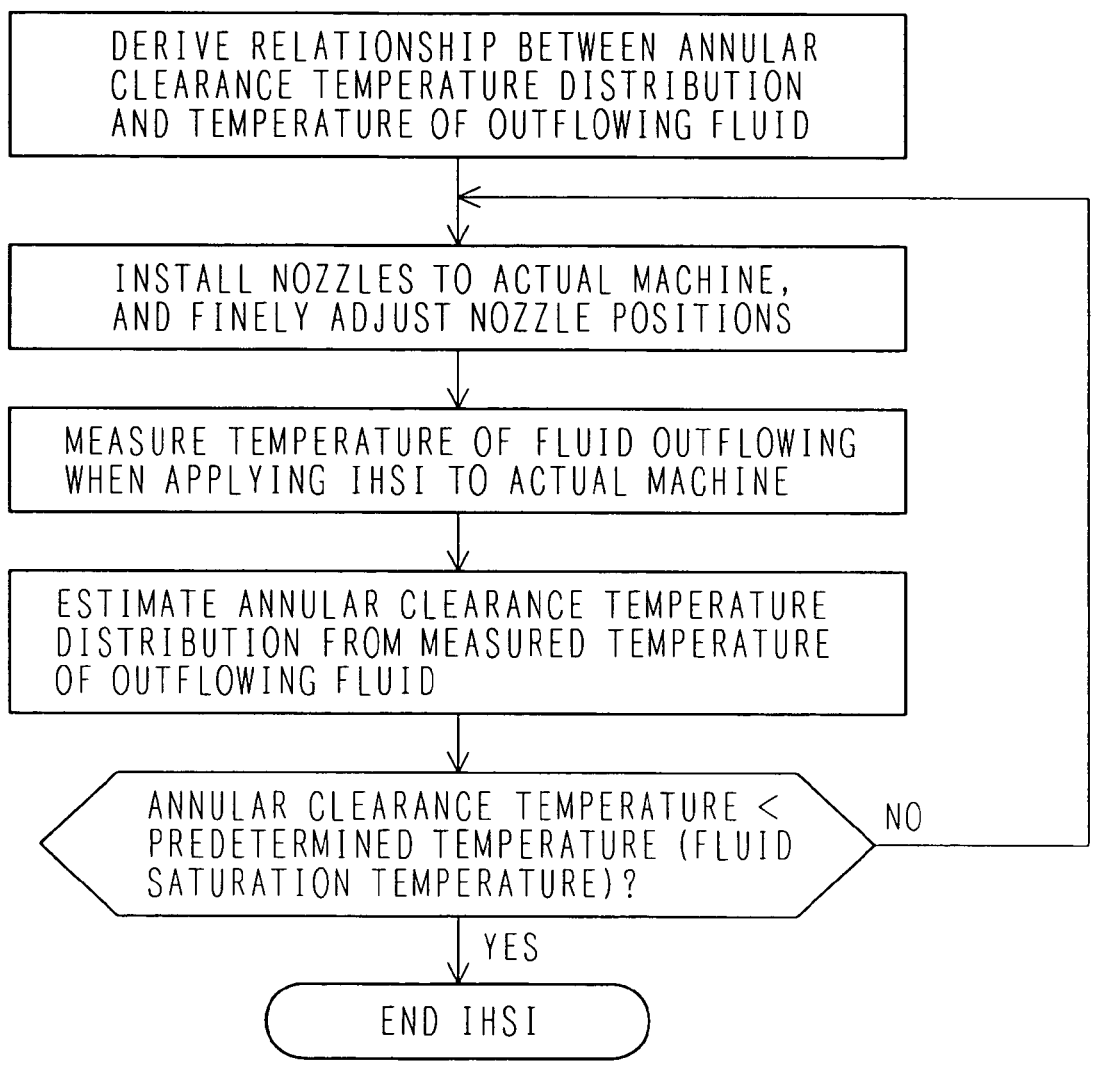
FIG. 24 is a flowchart of implementation procedure for IHSI according to the present invention.

FIG. 24 shows a flowchart showing IHSI execution procedure. First, in advance, the relationship between the temperature distribution in the annular clearance and outflowing fluid is derived. Next, nozzles are installed for executing IHSI. Thereafter, the execution of IHSI is performed. Herein, the temperature of outflowing fluid is measured. Then, using the relationship between the temperature distribution in the annular clearance and outflowing fluid that have been derived, the temperature distribution in the annular clearance is estimated. If the temperature distribution in the annular clearance is within a predetermined range, the execution of IHSI continues as is. On the other hand, if the temperature distribution in the annular clearance is outside of the predetermined range, resetting (or fine adjustment) of the nozzles is performed. After the predetermined execution, the execution of IHSI is completed. Here, if fluid in the annular clearance comes to a boil (film boiling), cooling becomes impossible, and therefore it is particularly important that the temperature of the fluid in the annular clearance does not exceed the saturation temperature thereof.

Next, the achievement of uniform cooling performance will be described. If the jetting direction of fluid is definite, there occur places where the main flow of the jet flows pass and places where they do not pass, so that the cooling performance with respect to the annular clearance becomes nonuniform. Also, at places where the main flow of jet flows pass, hot spots occur, so that film boiling is prone to occur. This being the case, the present inventors studied methods for making cooling performance uniform. As a result, the inventors have found, as new findings, that a method for oscillating jet flows in an up-and-down direction is effective in making cooling performance uniform. Additionally, it has been found that spouting jet flows, with the jet nozzles arranged in symmetry, makes the jet flows unstable to thereby oscillate them. Therefore, by vibrating jet flows in the up-and-down direction with the jet nozzles arranged in symmetry, the cooling performance can be made stable, resulting in suppressed hot spots. In reality, because it is difficult to arrange the jet nozzles at lower portions, the jet nozzles are arranged in symmetry in the horizontal direction (i.e., direction from 3 O'clock to 9 o'clock), as well as the jet flows are oscillated in the up-and-down direction, whereby the cooling performance is rendered uniform.

From the foregoing, the present inventors concluded that arranging the jet nozzles in symmetry in the direction from 3 O'clock to 9 o'clock (i.e., horizontal direction), and disposing the thermometer at the 12 o'clock position (i.e., at an upper position) facilitates monitoring the execution of IHSI and making cooling performance uniform.

Now, with reference to FIG. 25, description will be made of the IHSI N2 nozzle cooling method to which the present invention is applied. FIG. 25 is a structural view of a cooling apparatus 107 for applying the present invention, and an N2 nozzle system as an application object. The N2 nozzle system comprises an N2 nozzle 101, a thermal sleeve 102 inside the N2 nozzle 101, and a riser pipe 103 serving as a jet pump. A welding portion 104 in the N2 nozzle 101 is subjected to relaxation of residual stress by the execution of IHSI. The execution of IHSI is implemented by heating the outer surface of metal by a heater 105 and cooling the inner wall of the metal by inner water flows to give a temperature gradient in the radial direction, to the nozzle wall. When the piping is of a pure straight pipe, the inner surface of the piping is sufficiently cooled. However, in the annular clearance 106 on the piping inner surface at the welding portion, since the flow stagnates, fluid temperature increases, so that the inner surface of the piping cannot be sufficiently cooled. As such, in this embodiment, cooling water is spouted from the jet nozzles 108 provided in the cooling apparatus 107 toward an annular clearance 106, and the inner surface of the heated N2 nozzles 101 is cooled.

The cooling apparatus 107 is guided by remote control from an upper portion of the reactor. It is therefore necessary to verify whether the cooling apparatus 107 has been installed at a predetermined place. In this embodiment, it is verified whether the cooling apparatus 107 has been installed at the predetermined place by measuring the temperature of the fluid of which the temperature has been raised by cooling the heated portion, before and during the execution of IHSI. If it is determined that the cooling apparatus 107 has not been installed in a proper place, the cooling apparatus 107 is reset (or finely adjusted).

In this embodiment, in order to measure a fluid temperature, the cooling apparatus 107 has a thermometer 109. Here, the jet nozzles 108 are arranged at the center in the horizontal direction (direction from 3 o'clock to 9 o'clock), and the thermometer 109 is disposed at an upper portion (12 o'clock direction) in a state in which their peripheral positions are shifted from each other. The cooling water is driven by a pump 110, and is spouted from the jet nozzles 108 through piping 111. According to this embodiment, as indicated by the arrows in FIG. 25A, the jet flows spouted from the jet nozzle 108 travels toward the welding portion, and thereafter, the jet flows cool the heated portion to thereby the temperature raises, and flows out in the reactor from the upper and lower sides of the annular clearance 106 (the directions of 0 o'clock and 6 o'clock)

Figure 26:
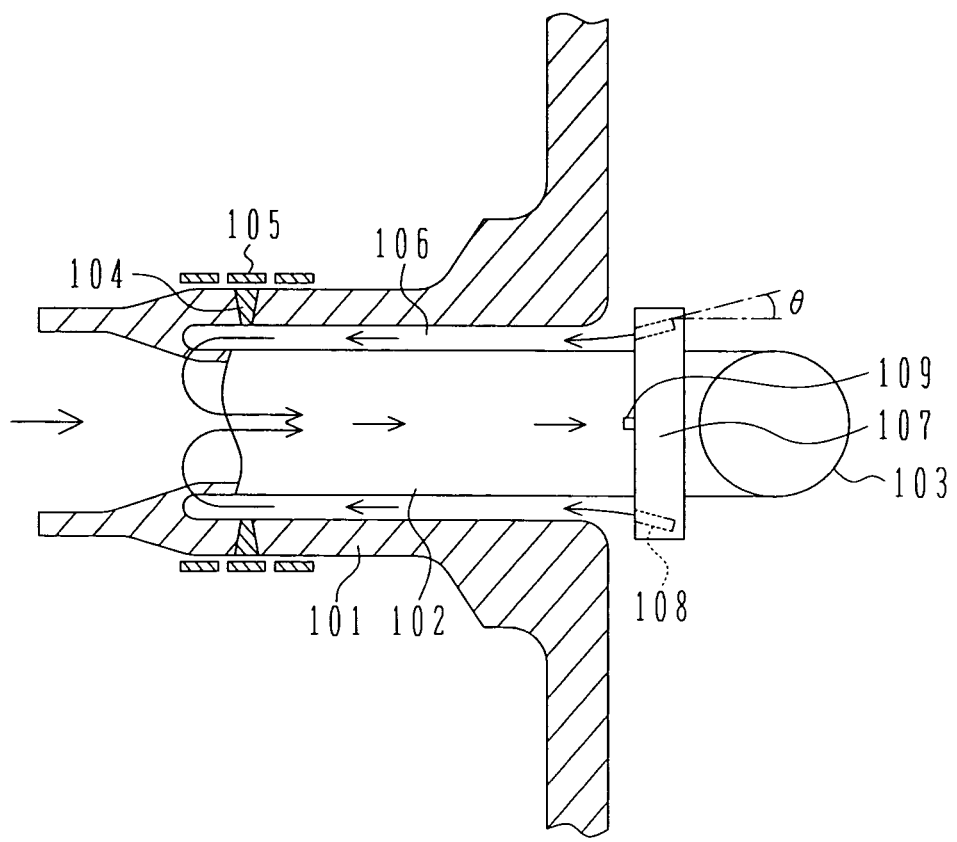
FIG. 26 is a schematic diagram showing the N2 nozzle cooling technique in IHSI according to the present invention, as viewed from the top surface of the N2 nozzle portion.

FIG. 26 is a top view of an embodiment in which the present invention is applied to the N2 nozzle. The jet nozzle 108 are tilted by 8 degrees under restriction from the structure. Water flows spouted from the cooling apparatus 107 flow toward the welding portion 104 along the horizontal portion (the direction from 3 o'clock to 9 o'clock) of the annular clearance 106, and after having collided against the base portion, travel separating into the upper and lower sides. The upside flow flows out from the annular clearance 106 into the reactor. At this time, the temperature of outflowing fluid is measured by the thermometer 109 disposed at the upper portion. Since high-temperature fluid stagnates in the higher portion, it is desirable that the thermometer 109 be disposed at the upper portion and measures the temperature of fluid flowing out from the upper portion to thereby monitor IHSI execution status.

Figure 27:
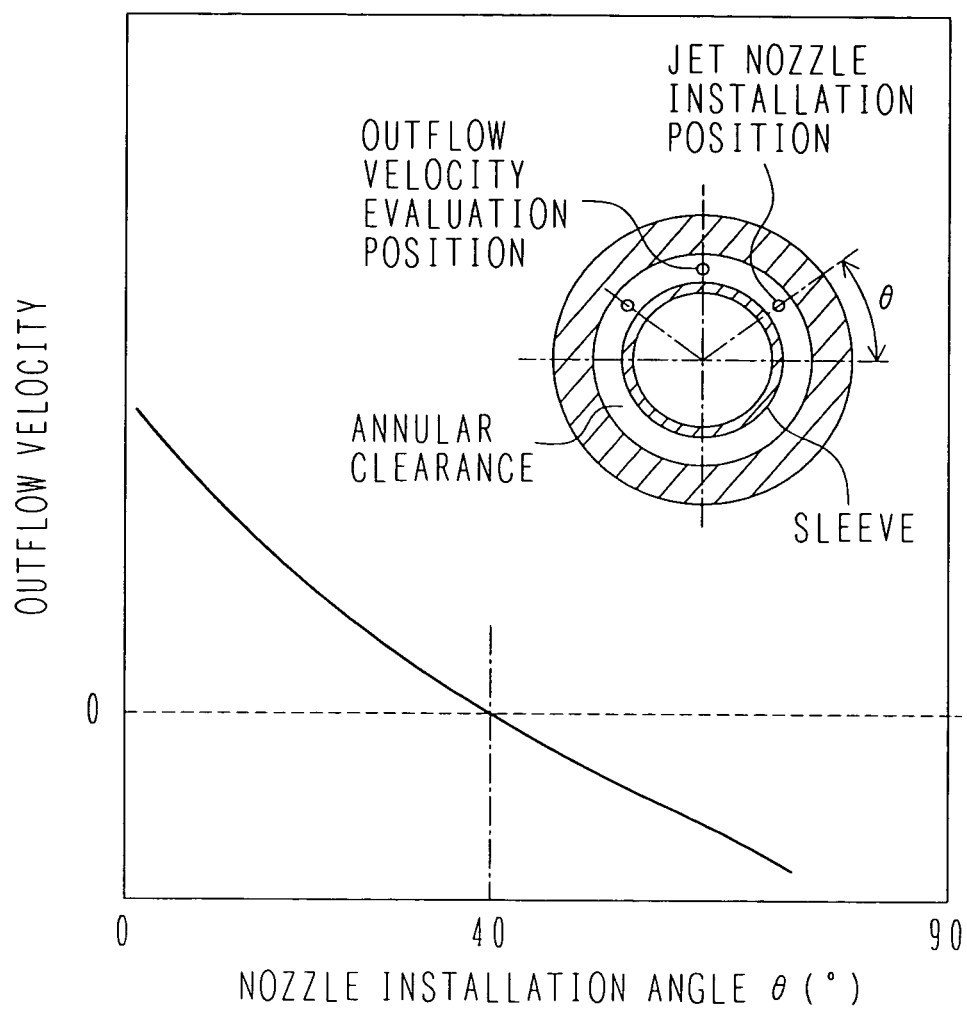
FIG. 27 is a schematic fluid outflow characteristic view under the N2 nozzle cooling technique in IHSI according to the present invention.

FIG. 27 shows the relationship between the installation angle of the jet nozzles 108 and the outflowing velocity at an upper portion. Here, the "outflowing velocity" refers to the velocity of fluid (jet flow) heading from the annular clearance 106 into the reactor. As shown in FIG. 27, the larger the installation angle θ (referring to the upper-right figure), the lower the outflowing velocity at the upper portion. If the region of θ=40 degrees is exceeded, the outflow of fluid (jet flow) from the upper side becomes nonexistent. Hence, in the region of θ>40 degrees, it is difficult to measure the temperature of outflowing fluid that has cooled the heated portion of the annular clearance 106 by the thermometer 109 provided at an upper portion. When the jet nozzles 108 are arranged within the range of ±40 degrees from the horizontal direction (the directions of 3 o'clock and 9 o'clock), the upward direction (direction of 12 o'clock) becomes an outflow direction. Therefore, in order to measure the temperature of fluid flowing out from the upper portion, the thermometer 109 for use in monitoring is installed at an upper portion (within the range of ±50 degrees from the direction of 12 o'clock). In this manner, separately installing the jet nozzles 108 and thermometer 109 in the peripheral direction allows an effective measurement of fluid temperature.

Figure 25A:
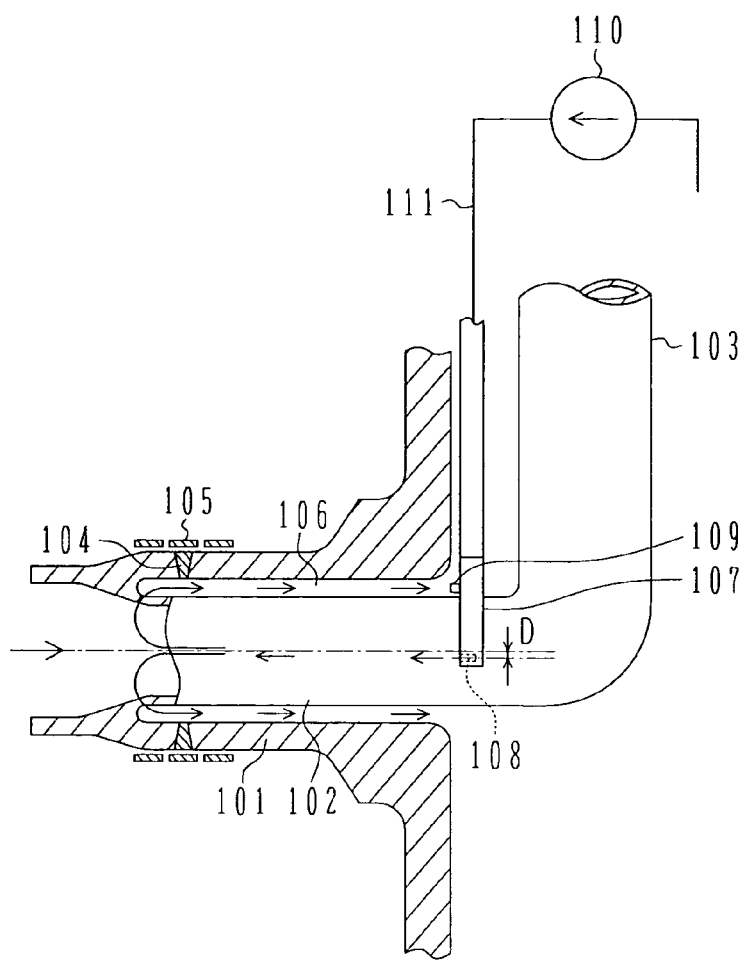
FIG. 25 is a schematic diagram of an N2 nozzle cooling technique in IHSI according to the present invention, as viewed from the side surface of an N2 nozzle portion.
Figure 25B:
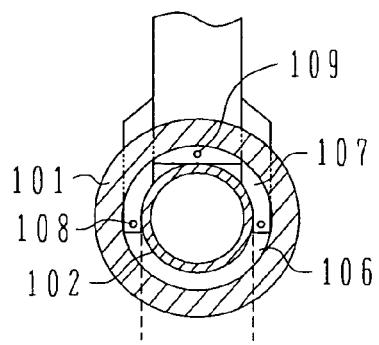

The number of jet nozzles (or nozzle) 108 are not limited, but when a plurality of them are used, they must be arranged in a substantially symmetric manner. It is virtually impossible to arrange the jet nozzles 108 or thermometer 109 at lower portions (6 o'clock position). However, as shown in FIG. 25A, by lowering the positions of jet nozzles 108 by D from the horizontal direction (direction from 3 o'clock to 9 o'clock) within the range observable from the upper side, it is possible to reliably flow out the fuel from the upper position. Here, the position of the jet nozzles 108 can be made lower than the horizontal direction (direction from 3 o'clock to 9 o'clock) if the positions of the jet nozzles 108 are located outside the tangent (dotted line in FIG. 25B) at positions of 3 o'clock and 9 o'clock. Thus, more reliable monitoring of the execution of IHSI can be achieved. In this case, as shown in FIG. 26, tilting the jet nozzles 108 by 8 degrees allows jet flows to smoothly flow into the annular clearance 106.

Figure 28A:
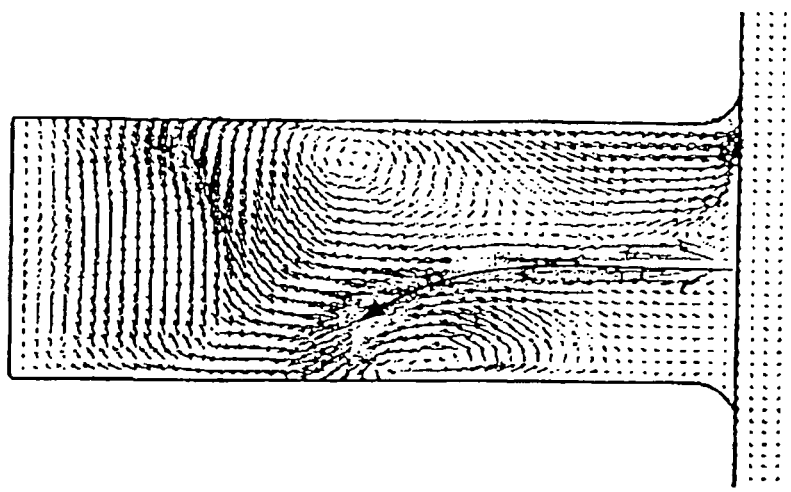
FIGS. 28A and 28B are flow velocity vector views showing a jet oscillation characteristic under the N2 nozzle cooling technique in IHSI according to the present invention.
Figure 28B:
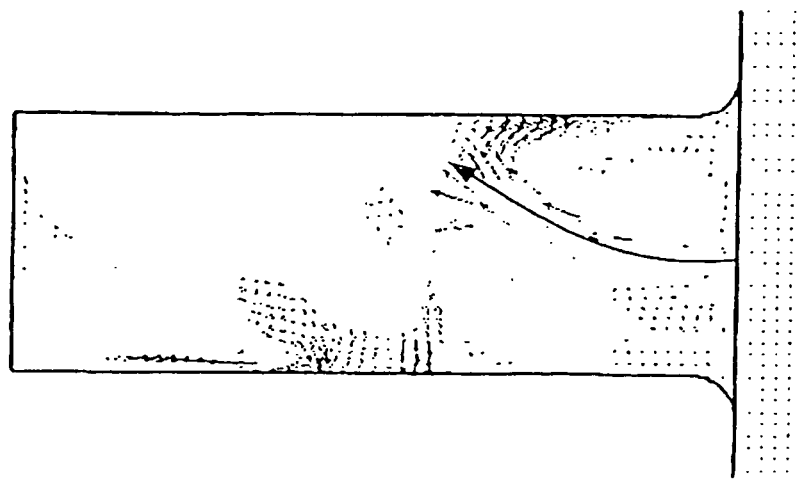

Furthermore, installing the jet nozzles 108 within the range of ±40 degrees from the horizontal direction (3 o'clock direction and 9 o'clock direction), promises to produce a uniform cooling effect. This effect will be described using the results from the computational fluid dynamics analysis. FIGS. 28A and 28B each show vectors of flows in the annular clearance 106 when the jet nozzles 108 are arranged within the range of ±40 degrees from the horizontal direction (3 o'clock direction and 9 o'clock direction). When the jet nozzles 108 are arranged in the horizontal direction (3 o'clock direction and 9 o'clock direction), flows in FIG. 28A and those in FIG. 28B alternately oscillatingly occurs, and alternately cool the upper portion and lower portion of the heated portion as shown in FIGS. 28A and 28B. This makes it possible to uniformly cool the heated portion. Because this phenomenon holds when fluid flows out toward each of the upper portion and lower portion, as shown in FIG. 27, it is necessary to arrange the jet nozzles 108 within the range of ±40 degrees from the horizontal direction (3 o'clock direction and 9 o'clock direction).

As described above, in order to monitor an execution status of IHSI, and achieve uniform cooling performance by jet flow oscillation, it is necessary to arrange the jet nozzles 108 within the range of ±40 degrees from the horizontal direction (3 o'clock direction and 9 o'clock direction), and dispose the thermometer 109 (sensor) within the range of ±50 degrees from an upper portion (12 o'clock position). Thereby, it is possible to secure inner surface cooling when applying IHSI to an actual machine, reliably relax residual stress in the nozzle welding portion of the pressure container of a reactor, and thereby supply a safer nuclear power plant.

What is claimed is:

1. An induction heating stress improvement method in a nuclear power plant including a recirculation inlet nozzle having an annular clearance, the recirculation inlet nozzle including an inner surface of piping having a fluid therein, the method comprising:

providing a header tank comprising at least one cooling nozzle and a thermometer;

installing the at least one cooling nozzle of a header tank within a range in a clockwise direction from one of a point at −45° from a horizontal position at 9 o'clock to a point at +45° from a horizontal position at 9 o'clock or a point at −45° from a horizontal position at 3 o'clock to a point at +45° from a horizontal position at 3 o'clock within the annular clearance of the recirculation inlet nozzle, supplying cooling water by the cooling nozzle to the inner surface of piping of the recirculation inlet nozzle, and verifying a cooling effect with respect to the inner surface of the piping by measuring a temperature of the fluid in the piping that has been raised by external heating of the recirculation inlet nozzle when applying the induction heating stress improvement method to the piping, and wherein an installation position of the thermometer is deviated from that of the cooling nozzle of the header tank in the peripheral direction by installing the thermometer within a range in a clockwise direction from a point at −45° from a position at 12 o'clock to a point at +45° from a position at 12 o'clock within the annular clearance of the recirculation inlet nozzle.

2. An induction heating stress improvement method in a recirculation inlet nozzle of primary loop recirculation piping in a nuclear power plant, the recirculation inlet nozzle having an annular clearance and the piping having a fluid therein, the method comprising:

providing a header tank comprising at least one cooling nozzle, installing the at least one cooling nozzle of a header tank within a range in a clockwise direction from one of a point at −45° from a horizontal position at 9 o'clock to a point at +45° from a horizontal position at 9 o'clock or a point at −45° from a horizontal position at 3 o'clock to a point at +45° from a horizontal position at 3 o'clock within an annular clearance of the recirculation inlet nozzle, about the center of the annular clearance in the horizontal direction, to thereby promote a cooling effect, supplying cooling water by the cooling nozzle to an inner surface of the piping, verifying a cooling effect with respect to the inner surface of the piping by measuring a fluid temperature of the fluid in the piping that has been raised by external heating of the piping when applying the induction heating stress improvement method to the piping, and installing a thermometer in the annular clearance of the recirculation inlet nozzle, the fluid temperature being measured by using the thermometer, and an installation position of the thermometer is deviated from that of the cooling nozzle of the header tank in the peripheral direction by installing the thermometer within a range in a clockwise direction from a point at −45° from a position at 12 o'clock to a point at +45° from a position at 12 o'clock within the annular clearance of the recirculation inlet nozzle.

3. An induction heating stress improvement method in a nozzle portion of a nuclear reactor pressure vessel for a nuclear power plant, the nozzle portion including an annular clearance and an inner surface of piping having a fluid therein, the method comprising:
- installing the least one cooling nozzle of a header tank within a range in a clockwise direction from one of a point at −45° from a horizontal position at 9 o'clock to a point at +45° from a horizontal position at 9 o'clock or a point at −45° from a horizontal position at 3 o'clock to a point at +45° from a horizontal position at 3 o'clock within an annular clearance of the nozzle portion;
- supplying cooling water by the cooling nozzle to the nozzle portion and
- verifying a cooling effect of the nozzle portion by measuring a fluid temperature of the fluid in the piping when applying the induction heating stress improvement method to the nozzle portion, or when performing preliminary heating, or before executing the induction heating stress improvement method, wherein
- the fluid temperature is measured by using the thermometer, and wherein
- an installation position of the thermometer is deviated from that of the cooling nozzle of the header tank in the peripheral direction by installing the thermometer within a range in a clockwise direction from a point at −45° from a position at 12 o'clock to a point at +45° from a position at 12 o'clock within the annular clearance of the nozzle portion.

* * * * *